US012227396B2

(12) United States Patent
Zushi et al.

(10) Patent No.: US 12,227,396 B2
(45) Date of Patent: Feb. 18, 2025

(54) WORK MACHINE

(71) Applicant: TADANO LTD., Kagawa (JP)

(72) Inventors: Masahide Zushi, Kagawa (JP); Kazu Nagahama, Kagawa (JP); Toshihiko Fukuoka, Kagawa (JP); Manato Shirai, Kagawa (JP)

(73) Assignee: TADANO LTD., Kagawa (JP)

( * ) Notice: Subject to any disclaimer, the term of this patent is extended or adjusted under 35 U.S.C. 154(b) by 373 days.

(21) Appl. No.: 17/600,287

(22) PCT Filed: Apr. 3, 2020

(86) PCT No.: PCT/JP2020/015267
§ 371 (c)(1),
(2) Date: Sep. 30, 2021

(87) PCT Pub. No.: WO2020/204153
PCT Pub. Date: Oct. 8, 2020

(65) Prior Publication Data

US 2022/0169484 A1 Jun. 2, 2022

(30) Foreign Application Priority Data

Apr. 4, 2019 (JP) ................................ 2019-072143

(51) Int. Cl.
*B66C 23/70* (2006.01)

(52) U.S. Cl.
CPC .......... *B66C 23/706* (2013.01); *B66C 23/708* (2013.01)

(58) Field of Classification Search
CPC ..... B66C 23/70; B66C 23/701; B66C 23/702; B66C 23/705; B66C 23/706;
(Continued)

(56) References Cited

U.S. PATENT DOCUMENTS 4,688,690 A * 8/1987 Gattu .................... B66C 23/708 212/292
6,474,486 B1 * 11/2002 Baraniak ............... B66C 23/705 212/292
(Continued)

FOREIGN PATENT DOCUMENTS

CN 101723262 A * 6/2010
CN 105417410 A * 3/2016
(Continued)

OTHER PUBLICATIONS

Dec. 1, 2022, European Search Report issued for related EP Application No. 20782937.5.
(Continued)

*Primary Examiner* — Michael R Mansen
*Assistant Examiner* — Henrix Soto
(74) *Attorney, Agent, or Firm* — Paratus Law Group, PLLC

(57) ABSTRACT

This work machine includes: an actuator that extends and retracts a telescopic boom; an electric drive source that is provided in the actuator and drives using power supplied from a power source; an operating unit that operates based on power of the electric drive source; an electric circuit capable of switching between a drive state in which a supply of power from the power source to the electric drive source is allowed to drive the electric drive source, and a braking state in which the supply of power from the power source to the electric drive source stops to generate a braking force to be applied to the electric drive source; and a control unit that controls the switching between the drive state and the braking state.

6 Claims, 16 Drawing Sheets

(58) Field of Classification Search
CPC ..... B66C 23/708; B66C 23/04; B66C 23/305; B66C 23/42; B66C 23/66; B66C 23/905; B66C 2700/085; E02F 3/286
USPC ........................................................... 212/299
See application file for complete search history.

(56) References Cited

U.S. PATENT DOCUMENTS

| | | | | |
|---|---|---|---|---|
| 6,575,318 | B2 * | 6/2003 | Stowasser | B66C 23/705 212/292 |
| 9,688,519 | B2 | 6/2017 | Kawabuchi et al. | |
| 9,868,617 | B2 * | 1/2018 | Ikeda | B66C 13/20 |
| 2015/0041422 | A1 * | 2/2015 | Kaupert | B66C 23/708 212/292 |
| 2015/0128735 | A1 | 5/2015 | Klein et al. | |
| 2017/0305727 | A1 * | 10/2017 | Schoonmaker | B66C 23/708 |

FOREIGN PATENT DOCUMENTS

| | | | | |
|---|---|---|---|---|
| DE | 202008007902 | U1 * | 12/2009 | B66C 23/705 |
| GB | 2299719 | A | 10/1996 | |
| JP | S48-081252 | A | 10/1973 | |
| JP | 2009298597 | A * | 12/2009 | B66C 23/64 |
| JP | 2012-096928 | A | 5/2012 | |
| JP | 2016-155654 | A | 9/2016 | |
| JP | 2017-154875 | A | 9/2017 | |
| JP | 2017-159973 | A | 9/2017 | |

OTHER PUBLICATIONS

May 26, 2020, International Search Report issued for related PCT application No. PCT/JP2020/015267.
May 26, 2020, International Search Opinion issued for related PCT application No. PCT/JP2020/015267.

* cited by examiner

WORK MACHINE

CROSS REFERENCE TO PRIOR APPLICATION

This application is a National Stage Patent Application of PCT International Patent Application No. PCT/JP2020/015267 (filed on Apr. 3, 2020) under 35 U.S.C. § 371, which claims priority to Japanese Patent Application No. 2019-072143 (filed on Apr. 4, 2019), which are all hereby incorporated by reference in their entirety.

TECHNICAL FIELD

The present invention relates to a work machine including a telescopic boom.

BACKGROUND ART

Patent Literature 1 discloses a mobile crane that includes a telescopic boom in which a plurality of boom elements overlap in a nested shape (also referred to as a telescopic shape.), and a hydraulic telescopic cylinder extending the telescopic boom.

The telescopic boom includes a boom connecting pin that connects adjacent overlapping boom elements. A boom element (hereinafter, referred to as a movable boom element.) released from the connection by the boom connecting pin is movable in a longitudinal direction (also referred to as an extending and retracting direction.) with respect to other boom elements.

A telescopic cylinder includes a rod member and a cylinder member. Such a telescopic cylinder connects the cylinder member to the movable boom element via the cylinder connecting pin. When the cylinder member moves in a telescopic direction in this state, the movable boom element moves together with the cylinder member, and the telescopic boom extends and retracts.

CITATION LIST

Patent Literature

Patent Literature 1: Japanese Patent Application Laid-Open No. 2012-96928

SUMMARY OF THE INVENTION

Problems to be Solved by the Invention

However, the crane as described above includes a hydraulic actuator that moves a boom connecting pin, a hydraulic actuator that moves a cylinder connecting pin, and a hydraulic circuit that supplies pressure oil to each actuator. Such a hydraulic circuit is provided, for example, around the telescopic boom. For this reason, a degree of freedom in design around the telescopic boom is likely to be reduced.

An object of the present invention is to provide a work machine capable of improving a degree of freedom in design around a telescopic boom.

Solutions to Problems

According to the present invention, a work machine includes:

an actuator that extends and retracts a telescopic boom;

an electric drive source that is provided in the actuator and drives using power supplied from a power source;

an operating unit that operates based on power of the electric drive source;

an electric circuit capable of switching between a drive state in which a supply of power from the power source to the electric drive source is allowed to drive the electric drive source, and a braking state in which the supply of power from the power source to the electric drive source stops to generate a braking force to be applied to the electric drive source; and a control unit that controls the switching between the drive state and the braking state.

Effects of the Invention

According to the present invention, it is possible to improve a degree of freedom in design around a telescopic boom.

DESCRIPTION OF EMBODIMENTS

Hereinafter, an example of embodiments according to the present invention will be described in detail with reference to the drawings. Note that a crane according to an embodiment to be described later is an example of a work machine according to the present invention, and the present invention is not limited to the embodiment to be described later.

EMBODIMENT

Figure 1:
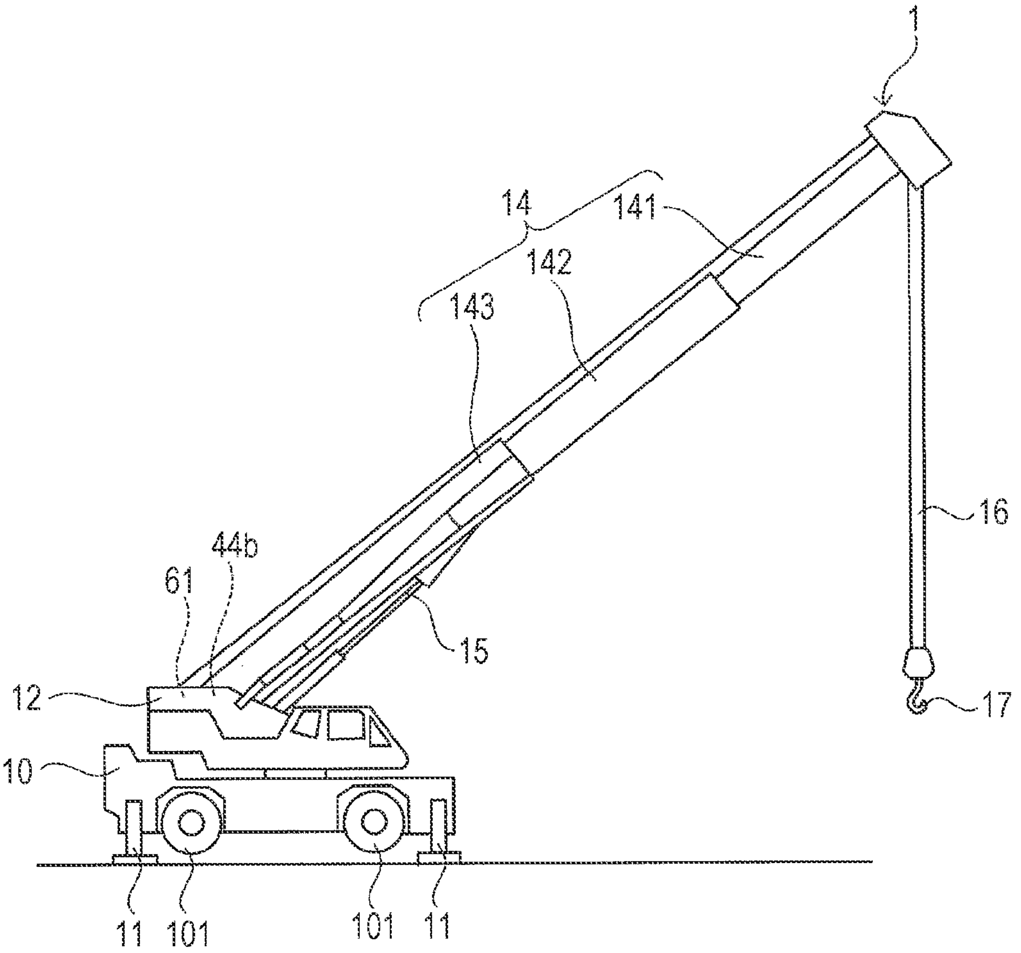
FIG. 1 is a schematic diagram of a mobile crane according to an embodiment.

FIG. 1 is a schematic diagram of a mobile crane 1 (in the case illustrated, a rough terrain crane) according to the present embodiment. The mobile crane 1 corresponds to an example of a work machine.

Examples of the mobile crane include an all-terrain crane, a truck crane, and a load-type truck crane (also referred to as a cargo crane.). However, the work machine according to the present invention is not limited to the mobile crane, and can also be applied to other work vehicles (for example, a crane or a high-place work vehicle) including a telescopic boom.

Hereinafter, first, an outline of the mobile crane 1 and a telescopic boom 14 included in the mobile crane 1 will be described. Thereafter, a specific structure and operation of an actuator 2, which is a feature of the mobile crane 1 according to the present embodiment, will be described.

<Mobile Crane>

As illustrated in FIG. 1, the mobile crane 1 includes a traveling body 10, an outrigger 11, a turning table 12, the telescopic boom 14, the actuator 2 (not illustrated in FIG. 1), an electric circuit 6 (see FIGS. 16A to 16D) a derricking cylinder 15, a wire 16, and a hook 17.

The traveling body 10 has a plurality of wheels 101. The outriggers 11 are provided at four corners of the traveling body 10. The turning table 12 is turnably provided on an upper portion of the traveling body 10. A proximal end portion of the telescopic boom 14 is fixed to the turning table 12. The actuator 2 extends and retracts the telescopic boom 14. The derricking cylinder 15 derricks the telescopic boom 14. The wire 16 hangs down from a tip portion of the telescopic boom 14. The hook 17 is provided at a tip of the wire 16.

<Telescopic Boom>

Next, the telescopic boom 14 will be described with reference to FIGS. 1 and 2A to 2E. FIGS. 2A to 2E are schematic diagrams for describing a structure and a telescopic operation of the telescopic boom 14.

Figures 2A, 2B, 2C, 2D, 2E:
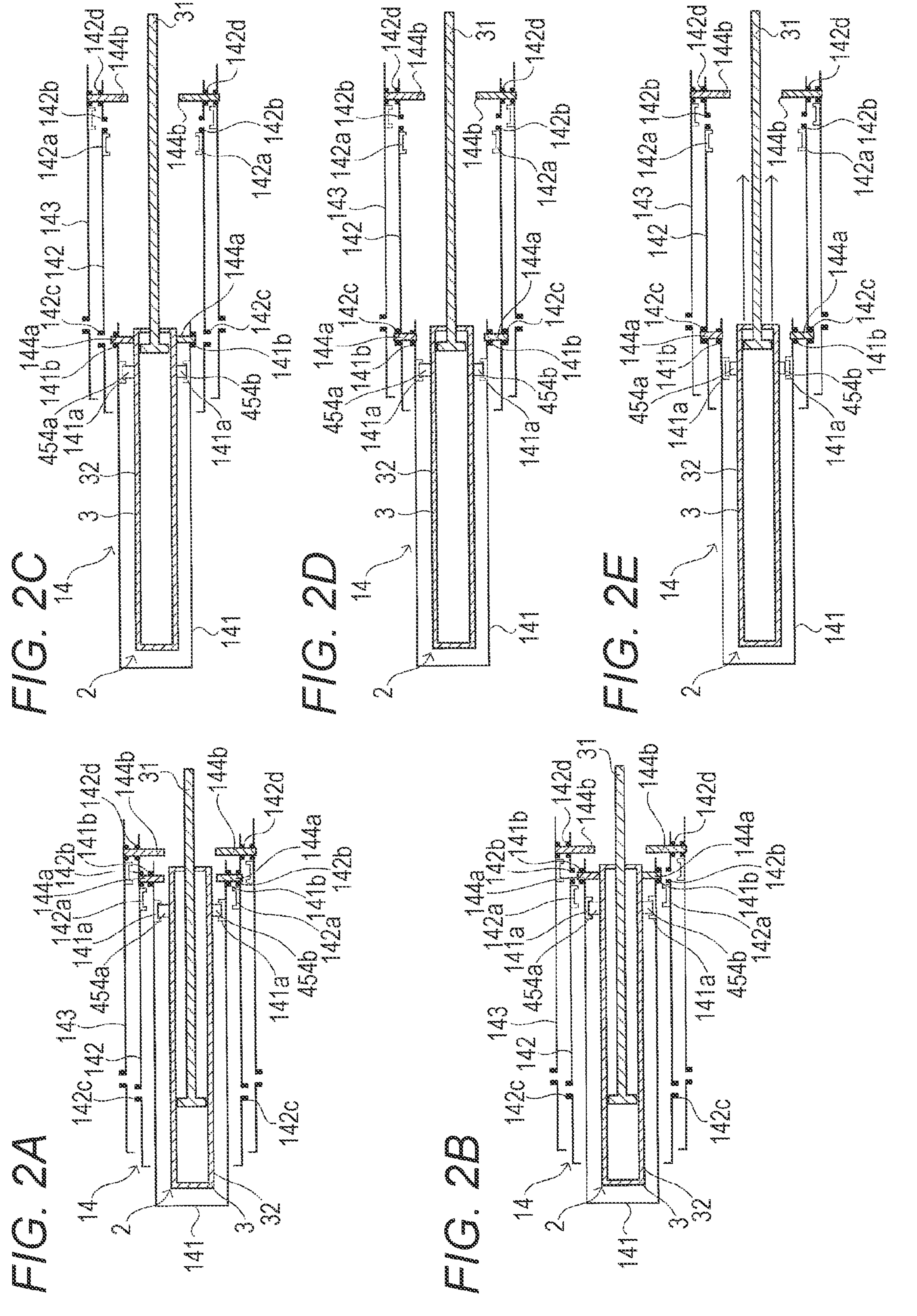
FIGS. 2A to 2E are schematic diagrams for describing a structure and a telescopic operation of the telescopic boom.
Figure 3A:
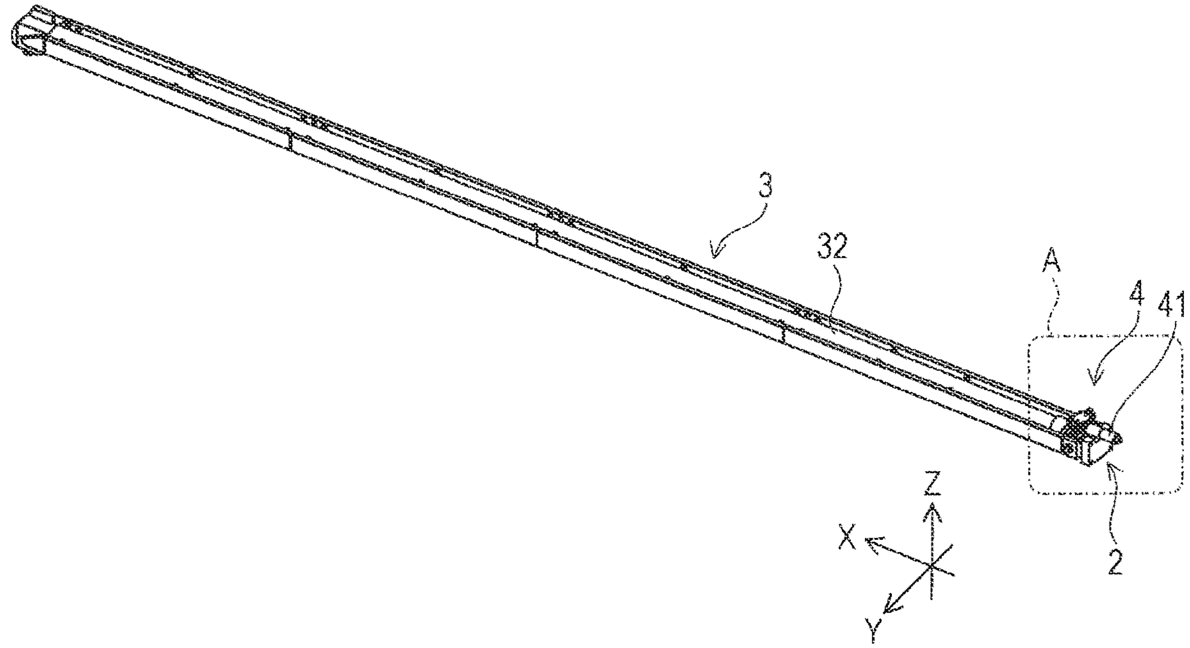
FIG. 3A is a perspective view of an actuator.
Figure 3B:
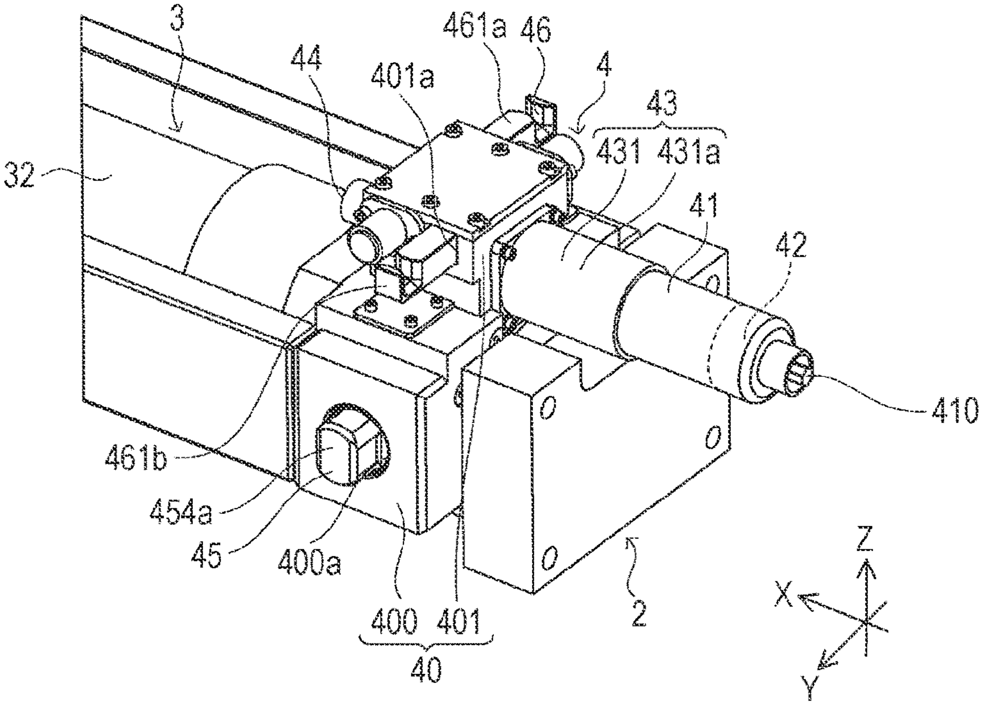
FIG. 3B is an enlarged view of portion A in FIG. 3A.
Figure 4:
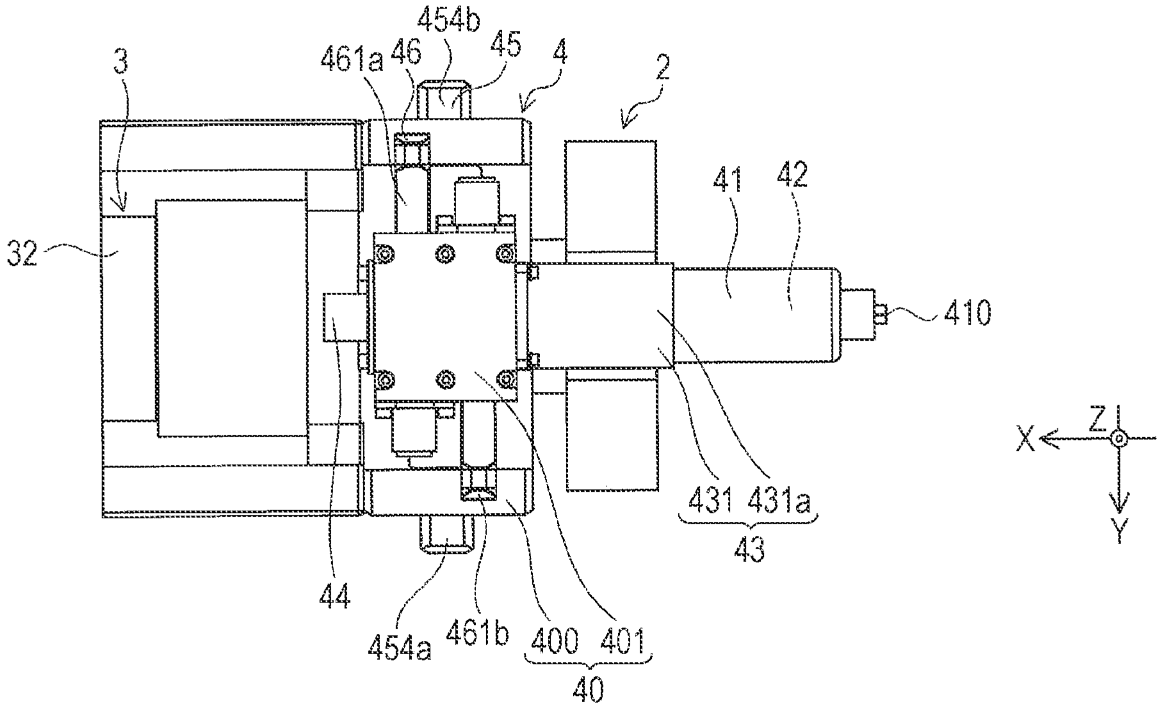
FIG. 4 is a partial plan view of the actuator.
Figure 5:
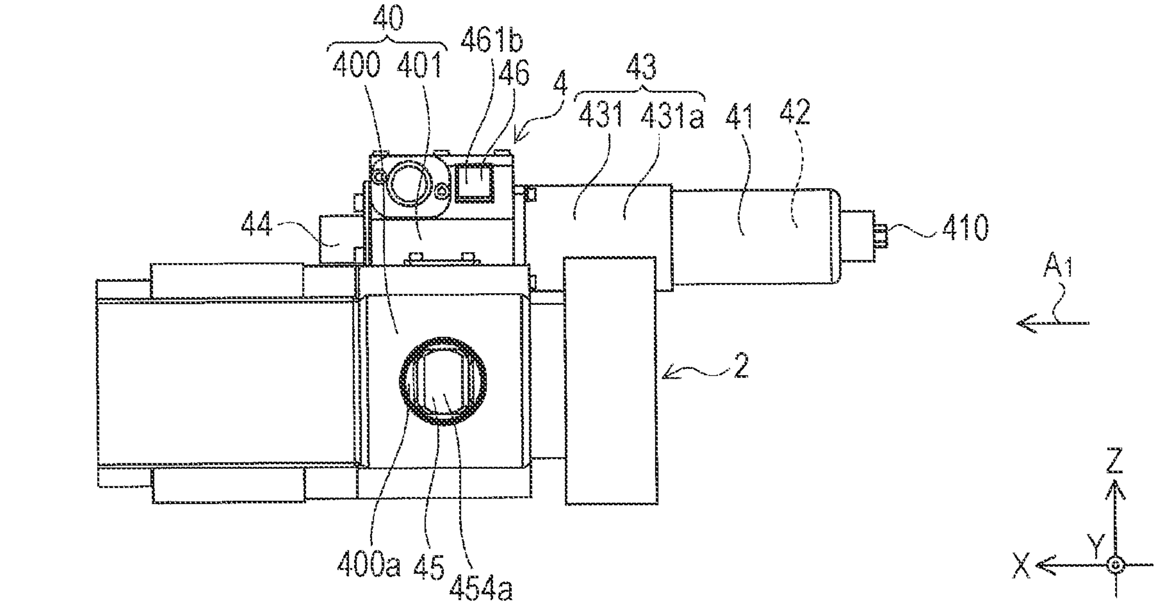
FIG. 5 is a partial side view of the actuator.
Figure 6:
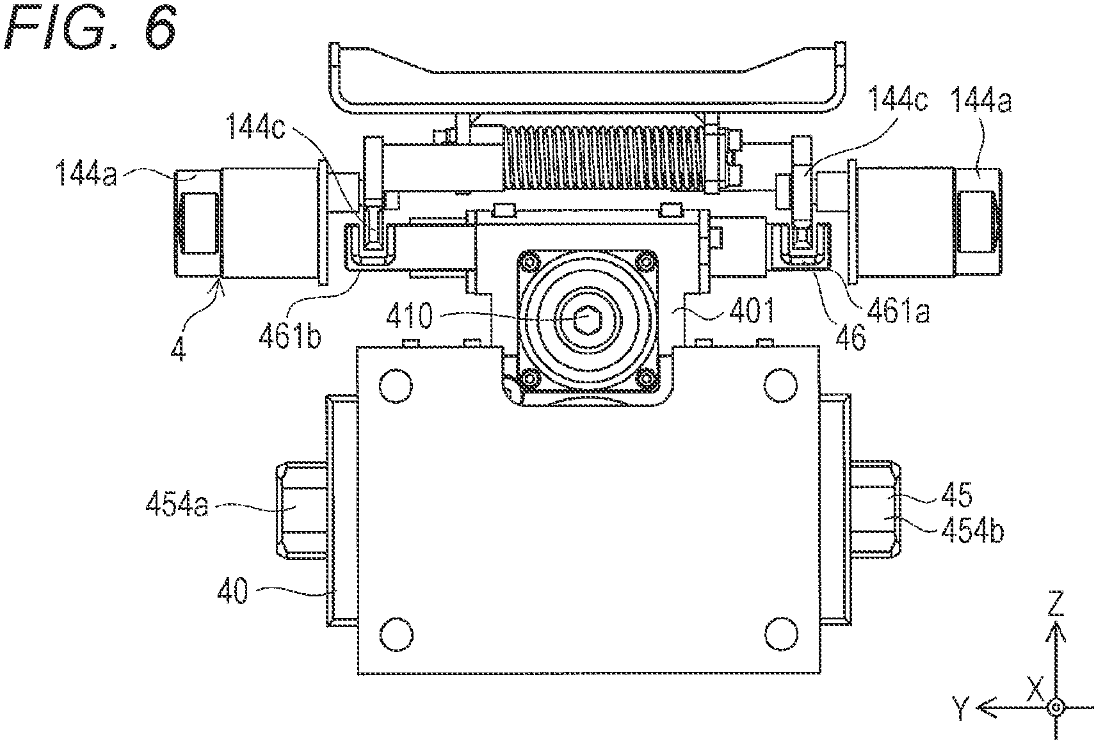
FIG. 6 is a view viewed in arrow $A_1$ of FIG. 5.

FIG. 1 illustrates the telescopic boom 14 in an extended state. FIG. 2A illustrates the telescopic boom 14 in a retracted state. FIG. 2E illustrates the telescopic boom 14 in which only the tip boom element 141 to be described later is extended.

The telescopic boom 14 includes a plurality of boom elements. Each of the plurality of boom elements has a tubular shape. The plurality of boom elements are combined with each other in a telescopic shape. Specifically, in the retracted state, the plurality of boom elements are a tip boom element 141, an intermediate boom element 142, and a proximal-end boom element 143 in order from the inside.

Note that in the case of the present embodiment, the tip boom element 141 and the intermediate boom element 142 correspond to an example of a first boom element movable in the telescopic direction. When tip boom element 141 moves in a telescopic direction with respect to the intermediate boom element 142, the tip boom element 141 corresponds to an example of the first boom element, and the intermediate boom element 142 corresponds to an example of a second boom element. When the intermediate boom element 142 moves in the telescopic direction with respect to the proximal-end boom element 143, the intermediate boom element 142 corresponds to an example of the first boom element, and the proximal-end boom element 143 corresponds to an example of the second boom element. Movement of the proximal-end boom element 143 in the telescopic direction is restricted.

The state of the telescopic boom transitions from the retracted state illustrated in FIG. 2A to the extended state illustrated in FIG. 1 by sequentially extending the telescopic boom 14 from the boom element (that is, the tip boom element 141) disposed on the inner side.

In the extended state, the intermediate boom element 142 is disposed between the proximal-end boom element 143 on the most proximal-end side and the tip boom element 141 on the most tip side. Note that a plurality of intermediate boom elements may be provided.

The structure of the telescopic boom 14 is substantially the same as the structure of the telescopic boom known in the related art, but for convenience of description of the structure and operation of the actuator 2 to be described later, the structures of the tip boom element 141 and the intermediate boom element 142 will be described below.

<Tip Boom Element>

The tip boom element 141 has a tubular shape as illustrated in FIGS. 2A to 2E. The tip boom element 141 has an internal space capable of accommodating the actuator 2. The tip boom element 141 has a pair of cylinder pin receiving parts 141*a* and a pair of boom pin receiving parts 141*b* at a proximal end portion The pair of cylinder pin receiving parts 141*a* is provided coaxially with each other at the proximal end portion of the tip boom element 141. Each of the pair of cylinder pin receiving parts 141*a* can be engaged with and disengaged from a pair of cylinder connecting pins 454*a* and 454*b* (also referred to as a first connecting member.) provided in a cylinder member 32 of a telescopic cylinder 3. That is, the pair of cylinder pin receiving parts 141*a* can take either an engaged state of being engaged with the pair of cylinder connecting pins 454*a* and 454*b* or a disengaged state of being disengaged from the pair of cylinder connecting pins 454*a* and 454*b*.

The cylinder connecting pins 454*a* and 454*b* move in an axial direction thereof based on an operation of a cylinder connecting mechanism 45 included in the actuator 2 to be described later. In a state in which the pair of cylinder connecting pins 454*a* and 454*b* and the pair of cylinder pin receiving parts 141*a* are engaged with each other, the tip boom element 141 is movable in the telescopic direction together with the cylinder member 32.

The pair of boom pin receiving parts 141*b* is provided coaxially with each other on the proximal-end side of the cylinder pin receiving part 141*a*. Each of the boom pin receiving parts 141*b* can be engaged with and disengaged from the pair of boom connecting pins 144*a* (also referred to as a second connecting member.). That is, the pair of boom pin receiving parts 141*b* can take either an engaged state of being engaged with the pair of boom connecting pins 144*a* or a disengaged state of being disengaged from the pair of boom connecting pins 144*a*.

Each of the pair of boom connecting pins 144*a* connects the tip boom element 141 and the intermediate boom element 142. The pair of boom connecting pins 144*a* moves in the axial direction thereof based on an operation of a boom connecting mechanism 46 included in the actuator 2. It may be understood that the pair of boom connecting pins 144*a* is constituent members of the boom connecting mechanism 46.

In a state in which the tip boom element 141 and the intermediate boom element 142 are connected by the pair of boom connecting pins 144*a*, the boom connecting pin 144*a* is inserted so as to be bridged between the boom pin receiving part 141*b* of the tip boom element 141 and a first boom pin receiving part 142*b* or a second boom pin receiving part 142*c* of the intermediate boom element 142 to be described later.

In a state in which the tip boom element 141 and the intermediate boom element 142 are connected (also referred to as a connected state.), the tip boom element 141 is prohibited from moving in the telescopic direction with respect to the intermediate boom element 142.

Meanwhile, when the tip boom element 141 and the intermediate boom element 142 are disconnected (also referred to as a disconnected state.), the tip boom element 141 can move in the telescopic direction with respect to the intermediate boom element 142.

<Intermediate Boom Element>

The intermediate boom element 142 has a tubular shape as illustrated in FIGS. 2A to 2E. The intermediate boom element 142 has an internal space capable of accommodating the tip boom element 141. The intermediate boom element 142 has a pair of cylinder pin receiving parts 142*a*, a pair of first boom pin receiving parts 142*b*, a pair of second boom pin receiving parts 142*c*, and a pair of third boom pin receiving parts 142*d* at the proximal end portion.

The pair of cylinder pin receiving parts 142*a* and the pair of first boom pin receiving parts 142*b* are substantially similar to the pair of cylinder pin receiving parts 141*a* and the pair of boom pin receiving parts 141*b* of the tip boom element 141, respectively.

The pair of third boom pin receiving parts 142*d* is provided coaxially with each other on the proximal-end side of the pair of first boom pin receiving parts 142*b*. The pair of boom connecting pins 144*b* is inserted into a pair of third boom pin receiving parts 142*d*, respectively. The pair of boom connecting pins 144*b* connects the intermediate boom element 142 and the proximal-end boom element 143.

The pair of second boom pin receiving parts 142*c* is provided coaxially with each other at the tip portion of the intermediate boom element 142. The pair of boom connecting pins 144*a* is inserted into the pair of second boom pin receiving parts 142*c*, respectively.

<Actuator>

Hereinafter, the actuator 2 will be described with reference to FIGS. 3A to 19C. The actuator 2 is an actuator that extends and retracts the above-described telescopic boom 14 (see FIGS. 1 and 2A to 2E).

The actuator 2 includes the telescopic cylinder 3 and a pin moving module 4. The actuator 2 is disposed in the internal space of the tip boom element 141 in the retracted state of the telescopic boom 14 (the state illustrated in FIG. 2A).

<Telescopic Cylinder>

The telescopic cylinder 3 includes a rod member 31 (also referred to as a fixing-side member. See FIGS. 2A to 2E) and the cylinder member 32 (also referred to as a movable side member.). The telescopic cylinder 3 moves a boom element (for example, the tip boom element 141 or the intermediate boom element 142) connected to the cylinder member 32 via the cylinder connecting pins 454*a* and 454*b* to be described later in the telescopic direction. Since the structure of the telescopic cylinder 3 is substantially similar to the structure of the conventionally known telescopic cylinder, a detailed description thereof will be omitted.

<Pin Moving Module>

Figure 7:
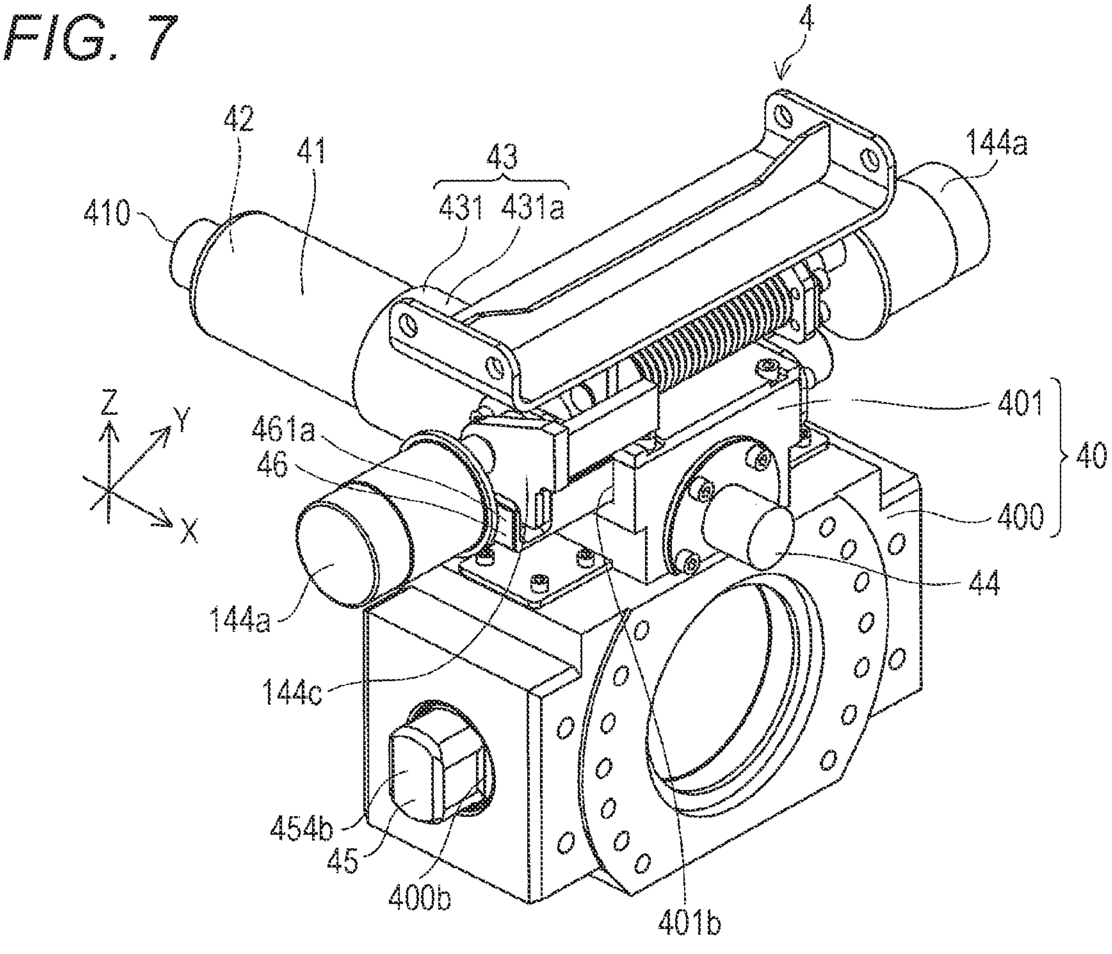
FIG. 7 is a perspective view of a pin moving module holding a boom connecting pin.

The pin moving module 4 includes a housing 40, an electric motor 41, a brake mechanism 42, a transmission mechanism 43, a position information detection device 44, a cylinder connecting mechanism 45, a boom connecting mechanism 46, and a lock mechanism 47 (see FIG. 7).

Hereinafter, each member constituting the actuator 2 will be described with reference to a state of being incorporated in the actuator 2. In addition, in the description of the actuator 2, an orthogonal coordinate system (X, Y, Z) illustrated in each drawing is used. However, the arrangement of each unit constituting the actuator 2 is not limited to the arrangement of the present embodiment.

In the orthogonal coordinate system illustrated in each drawing, an X direction coincides with the telescopic direction of the telescopic boom 14 mounted on the mobile crane 1. A + side in the X direction is also referred to as an extending direction in the telescopic direction. A − side in the X direction is also referred to as a retracting direction in the telescopic direction. For example, a Z direction coincides with a vertical direction of the mobile crane 1 in a state in which a derricking angle of the telescopic boom 14 is 0 (also referred to as a fallen state of the telescopic boom 14.). For example, a Y direction coincides with a vehicle width direction of the mobile crane 1 in a state in which the telescopic boom 14 faces forward. However, the Y direction and the Z direction are not limited to the above directions as long as they are two directions orthogonal to each other.

<Housing>

The housing 40 is fixed to the cylinder member 32 of the telescopic cylinder 3. The housing 40 accommodates the cylinder connecting mechanism 45 and the boom connecting mechanism 46 in the internal space. The housing 40 supports the electric motor 41 via the transmission mechanism 43. Furthermore, the housing 40 also supports a brake mechanism 42 to be described later. Such a housing 40 unitizes each of the above-described elements. Such a configuration contributes to miniaturization of the pin moving module 4, improvement in productivity, and improvement in system reliability.

Specifically, the housing 40 has a box-shaped first housing element 400 and a box-shaped second housing element 401.

The first housing element 400 accommodates the cylinder connecting mechanism 45 to be described later in the internal space. The rod member 31 is inserted through the first housing element 400 in the X direction. An end portion of the cylinder member 32 is fixed to a side wall of the first housing element 400 on the + side in the X direction (the left side in FIG. 4 and the right side in FIG. 7).

The first housing element 400 has through holes 400*a* and 400*b* (see FIGS. 3B and 7) in side walls on both sides in the Y direction. A pair of cylinder connecting pins 454*a* and 454*b* of the cylinder connecting mechanism 45 are inserted into the through holes 400*a* and 400*b*, respectively.

The second housing element 401 is provided on a + side in the Z direction of the first housing element 400. The second housing element 401 accommodates the boom connecting mechanism 46 to be described later in the internal space. A transmission shaft 432 (see FIG. 8) of the transmission mechanism 43 to be described later is inserted into the second housing element 401 in the X direction.

The second housing element 401 has through holes 401*a* and 401*b* (see FIGS. 3B and 7) in side walls on both sides in the Y direction. A pair of second rack bars 461*a* and 461*b* of the boom connecting mechanism 46 are inserted into the through holes 401*a* and 401*b*, respectively.

<Electric Motor>

The electric motor 41 corresponds to an example of an electric drive source, and is supported by the housing 40 via a speed reducer 431 of the transmission mechanism 43. Specifically, the electric motor 41 is disposed around the cylinder member 32 (for example, + side in the Z direction) and around the second housing element 401 (for example, the – side in the X direction) in a state in which an output shaft (not illustrated) is parallel to the X direction (also referred to as a longitudinal direction of the cylinder member 32.). Such an arrangement contributes to miniaturization of the pin moving module 4 in the Y direction and the Z direction.

The electric motor 41 as described above is connected to, for example, a power source device 61 (see FIGS. 16A to 16D) provided on the turning table 12 via a power supply cable. Furthermore, the electric motor 41 is connected to, for example, a control unit 44*b* (see FIG. 1) provided on a turning table 12 via a control signal transmission cable.

Each of the above-described cables can be unreeled and wound by a cord reel that is provided outside the proximal end portion of the telescopic boom 14 or on the turning table 12 (see FIG. 1).

In addition, the electric motor 41 includes manual operation unit 410 (see FIG. 3B) that can be operated by a manual handle (not illustrated). The manual operation unit 410 is for manually performing the state transition of the pin moving module 4. When the manual operation unit 410 is turned by the manual handle at the time of failure or the like, an output shaft of the electric motor 41 rotates and the state of the pin moving module 4 transitions.

Note that the number of electric motors may be one or plural (for example, two). When the number of electric motors is one, as in the present embodiment, the cylinder connecting mechanism 45 and the boom connecting mechanism 46 operate by one electric motor 41. In addition, when the number of electric motors is plural (for example, two), the first electric motor (not illustrated) may operate the cylinder connecting mechanism 45, and the second electric motor (not illustrated) may operate the boom connecting mechanism 46.

Note that in the present embodiment, the electric drive source is the electric motor 41 described above. However, the electric drive source is not limited to the electric motor. For example, the electric drive source may be various drive sources that generate driving force based on energization from a power source.

<Brake Mechanism>

The brake mechanism 42 applies a braking force to the electric motor 41. The brake mechanism 42 prevents the rotation of the output shaft of the electric motor 41 while the electric motor 41 stops. As a result, the state of the pin moving module 4 is maintained in the stopped state of the electric motor 41.

In addition, the brake mechanism 42 may allow the rotation (that is, sliding) of the electric motor 41 when an external force of a predetermined magnitude acts on the cylinder connecting mechanism 45 or the boom connecting mechanism 46 at the time of braking. Such a configuration contributes to prevention of damage to the electric motor 41, each gear, or the like that constitute the actuator 2. Note that when such a configuration is adopted, for example, a friction brake can be adopted as the brake mechanism 42.

Specifically, the brake mechanism 42 operates in the retracted state of the cylinder connecting mechanism 45 or the retracted state of the boom connecting mechanism 46 to be described later to maintain the states of the cylinder connecting mechanism 45 and the boom connecting mechanism 46.

The brake mechanism 42 is disposed in front of the transmission mechanism 43 to be described later. Specifically, the brake mechanism 42 is disposed coaxially with the output shaft of the electric motor 41 on the – side in the X direction (that is, the side opposite to the transmission mechanism 43 with the electric motor 41 as the center) with respect to the electric motor 41 (see FIG. 3B).

Such an arrangement contributes to miniaturization of the pin moving module 4 in the Y direction and the Z direction. Note that a front stage means an upstream side (side close to the electric motor 41) in a transmission path through which the power of the electric motor 41 is transmitted to the cylinder connecting mechanism 45 or the boom connecting mechanism 46. On the other hand, a rear stage means a downstream side (side far from the electric motor 41) in a transmission path through which the power of the electric motor 41 is transmitted to the cylinder connecting mechanism 45 or the boom connecting mechanism 46.

A brake torque necessary for maintaining the stopped state of the electric motor 41 is smaller in the configuration in which the brake mechanism 42 is disposed at the front stage of the transmission mechanism 43 than in the configuration in which the brake mechanism 42 is disposed at the rear stage of the transmission mechanism 43 (a speed reducer 431 to be described later). For this reason, the configuration in which the brake mechanism 42 is disposed at the front stage of the transmission mechanism 43 contributes to downsizing of the brake mechanism 42.

Note that the brake mechanism 42 may be various brake devices such as a mechanical brake device and an electromagnetic brake device. In addition, the position of the brake mechanism 42 is not limited to the position of the present embodiment.

<Transmission Mechanism>

The transmission mechanism 43 transmits power (that is, rotational motion) of the electric motor 41 to the cylinder connecting mechanism 45 and the boom connecting mechanism 46. The transmission mechanism 43 includes the speed reducer 431 and a transmission shaft 432 (see FIG. 8).

The speed reducer 431 decelerates the rotation of the electric motor 41 and transmits the decelerated rotation to the transmission shaft 432. The speed reducer 431 is, for example, a planetary gear mechanism housed in a speed reducer case 431*a*. The speed reducer 431 is provided coaxially with the output shaft of the electric motor 41. Such an arrangement contributes to miniaturization of the pin moving module 4 in the Y direction and the Z direction.

An end portion of the transmission shaft 432 on the – side in the X direction is connected to an output shaft (not illustrated) of the speed reducer 431. In this state, the transmission shaft 432 rotates together with the output shaft of the speed reducer 431. The transmission shaft 432 extends in the X direction and is inserted into the housing 40 (specifically, the second housing element 401). Note that the transmission shaft 432 may be integrated with the output shaft of the speed reducer 431.

An end portion of the transmission shaft 432 on the + side in the X direction protrudes to the + side in the X direction from the housing 40. A position information detection device 44 to be described later is provided at an end portion of the transmission shaft 432 on the + side in the X direction.

<Position Information Detection Device>

Figure 18A:
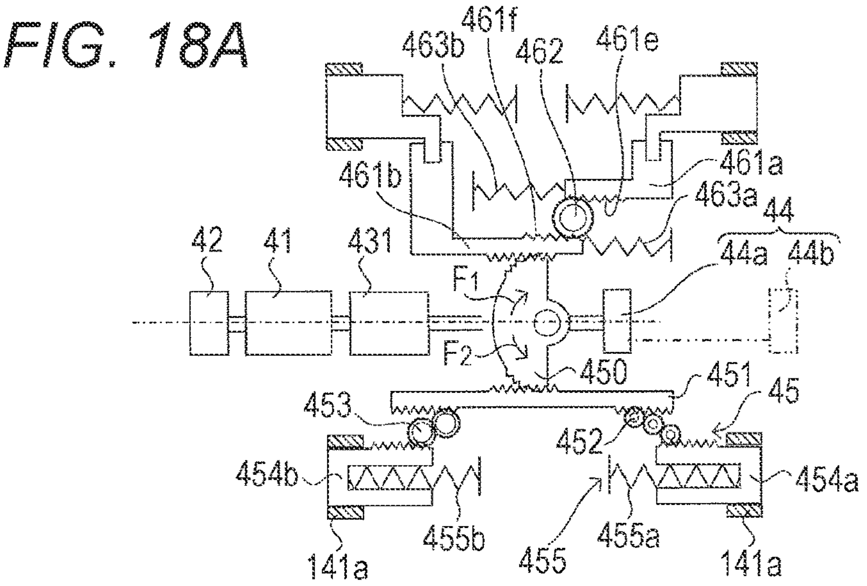
FIG. 18A is a schematic diagram for describing an operation of a cylinder connecting mechanism.
Figure 19A:
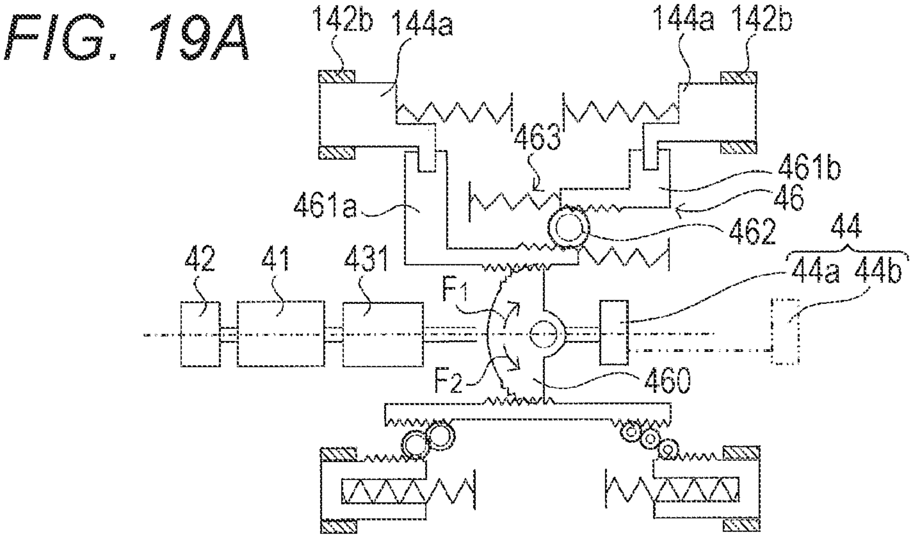
FIG. 19A is a schematic diagram for describing an operation of a boom connecting mechanism.

The position information detection device 44 detects information on the positions of the pair of cylinder connecting pins 454*a* and 454*b* and the pair of boom connecting pins 144*a* (the pair of boom connecting pins 144*b* may be used. The same applies hereinafter.) based on the output (for example, the rotation of the output shaft) of the electric motor 41. The information on the position may be, for example, a movement amount of the pair of cylinder connecting pins 454*a* and 454*b* or the pair of boom connecting pins 144*a* from a reference position (the position illustrated in FIGS. 18A and 19A). The positions of the pair of cylinder connecting pins 454*a* and 454*b* illustrated in FIGS. 18A and 19A are defined as reference positions of the cylinder connecting pins 454*a* and 454*b*. In addition, the positions of the pair of boom connecting pins 144*a* illustrated in FIGS. 18A and 19A are defined as a reference position of the boom connecting pin 144*a*.

Specifically, the position information detection device 44 detects the information on the positions of the pair of cylinder connecting pins 454*a* and 454*b* in the engaged state (for example, the state illustrated in FIG. 2A) or the disengaged state (the state illustrated in FIG. 2E) between the pair of cylinder connecting pins 454*a* and 454*b* and the pair of cylinder pin receiving parts 141*a* of the boom element (for example, the tip boom element 141).

In addition, the position information detection device 44 detects the information on the positions of the pair of boom connecting pins 144*a* in the engaged state (for example, the state illustrated in FIGS. 2A and 2D) or the disengaged state (for example, the state illustrated in FIG. 2B) between the pair of boom connecting pins 144*a* and the pair of first boom pin receiving parts 142*b* (the pair of second boom pin receiving parts 142*c* may be used. The same applies hereinafter.) of the boom element (for example, the intermediate boom element 142).

The information on the positions of the pair of cylinder connecting pins 454*a* and 454*b* and the pair of boom connecting pins 144*a* and 144*b* detected in this manner is used for various controls of the actuator 2 including operation control of the electric motor 41, for example.

The position information detection device 44 includes a detection unit 44*a* and a control unit 44*b* (see FIG. 18A).

The detection unit 44*a* is, for example, a rotary encoder, and outputs information (for example, a pulse signal and a code signal) corresponding to the rotation amount of the output shaft of the electric motor 41. The output method of the rotary encoder is not particularly limited, and may be an incremental method of outputting a pulse signal (relative angle signal) according to the rotation amount (rotation angle) from a measurement start position, or an absolute method of outputting a code signal (absolute angle signal) corresponding to an absolute angle position with respect to the reference point.

When the detection unit 44*a* is an absolute type rotary encoder, even when control unit 44*b* returns from the non-energized state to the energized state, the position information detection device 44 can detect the information on the positions of the pair of cylinder connecting pins 454*a*, 454*b* and the pair of boom connecting pins 144*a*.

The detection unit 44*a* may be provided on the output shaft of the electric motor 41. In addition, the detection unit 44*a* may be provided on a rotating member (for example, a rotation shaft, a gear, or the like) that rotates together with the output shaft of the electric motor 41. Specifically, in the case of the present embodiment, the detection unit 44*a* is provided at an end portion of the transmission shaft 432 on the + side in the X direction. In other words, in the case of the present embodiment, the detection unit 44*a* is provided at a stage (that is, the + side in the X direction) subsequent to the speed reducer 431.

In the case of the present embodiment, the detection unit 44*a* outputs information corresponding to the rotation amount of the transmission shaft 432. In the case of the present embodiment, a rotary encoder capable of obtaining sufficient resolution with respect to a rotation number (rotation speed) of the transmission shaft 432 is adopted as the detection unit 44*a*. Note that since a first toothless gear 450 of the cylinder connecting mechanism 45 and a second toothless gear 460 of the boom connecting mechanism 46, which will be described later, are fixed to the transmission shaft 432, the output information of the detection unit 44*a* is also information corresponding to the rotation amounts of the first toothless gear 450 and the second toothless gear 460.

The detection unit 44*a* having the above configuration sends the detection value to the control unit 44*b*. The control unit 44*b* that has acquired the information calculates the information on the positions of the pair of cylinder connecting pins 454*a* and 454*b* or the pair of boom connecting pins 144*a* based on the acquired information. Then, the control unit 44*b* controls the electric motor 41 based on the calculation result.

The control unit 44*b* is, for example, an in-vehicle computer including an input terminal, an output terminal, a CPU, a memory, and the like. The control unit 44*b* calculates the information on the positions of the pair of cylinder connecting pins 454*a* and 454*b* or the boom connecting pin 144*a* based on the output of the detection unit 44*a*.

Specifically, for example, the control unit 44*b* calculates the information on the position using data (tables, maps, or the like) indicating a correlation between the output of the detection unit 44*a* and the information (for example, the movement amount from the reference position) on the positions of the pair of cylinder connecting pins 454*a* and 454*b* and the pair of boom connecting pins 144*a*.

When the output of the detection unit 44*a* is a code signal, the information on the position is calculated based on data (tables, maps, or the like) indicating a correlation between each code signal and the movement amount of the pair of cylinder connecting pins 454*a* and 454*b* and the pair of boom connecting pins 144*a* from the reference position.

The control unit 44*b* as described above is provided on the turning table 12. However, the position of the control unit 44*b* is not limited to the turning table 12. The control unit 44*b* may be provided, for example, in a case (not illustrated) in which the detection unit 44*a* is disposed.

Note that the position of the detection unit 44*a* is not limited to the position of the present embodiment. For example, the detection unit 44*a* may be disposed in front of the speed reducer 431 (that is, the − side in the X direction). That is, the detection unit 44*a* may acquire information to be sent to the control unit 44*b* based on the rotation of the electric motor 41 before being decelerated by the speed reducer 431. The resolution of the detection unit 44*a* is higher in the configuration in which the detection unit 44*a* is disposed at the front stage of the speed reducer 431 than in the configuration in which the detection unit 44*a* is disposed at the rear stage of the speed reducer 431.

The detection unit 44*a* is not limited to the above-described rotary encoder. For example, the detection unit 44*a* may be a limit switch. The limit switch is disposed at the stage subsequent to the speed reducer 431. Such a limit switch mechanically operates based on the output of the electric motor 41. Alternatively, the detection unit 44*a* may be a proximity sensor. The proximity sensor is disposed at the stage subsequent to the speed reducer 431. In addition, the proximity sensor is disposed to face a member that rotates based on the output of the electric motor 41. Such a proximity sensor outputs a signal based on the distance from the rotating member. Then, the control unit 44*b* controls the operation of the electric motor 41 based on the output of the limit switch or the proximity sensor.

<Cylinder Connecting Mechanism>

The cylinder connecting mechanism 45 corresponds to an example of an operating unit, operates based on the power (that is, rotational motion) of the electric motor 41, and transitions between an extended state (also referred to as a first state. See FIGS. 8 and 12) and a retracted state (also referred to as a second state. See FIG. 13).

In the extended state, the pair of cylinder connecting pins 454*a* and 454*b* to be described later and the pair of cylinder pin receiving parts 141*a* of the boom element (for example, the tip boom element 141) are in the engaged state (also referred to as a state in which a cylinder pin is inserted.). In the engaged state, the boom element and the cylinder member 32 are connected.

On the other hand, in the retracted state, the pair of cylinder connecting pins 454*a* and 454*b* and the pair of cylinder pin receiving parts 141*a* (see FIGS. 2A to 2E) are in the separated state (the state illustrated in FIG. 2E, and also referred to as a pulled state of a cylinder pin.). In the separated state, the boom element and the cylinder member 32 are in the disconnected state.

Hereinafter, a specific configuration of the cylinder connecting mechanism 45 will be described. As illustrated in FIGS. 9 to 13, the cylinder connecting mechanism 45 includes a first toothless gear 450, a first rack bar 451, a first gear mechanism 452, a second gear mechanism 453, a pair of cylinder connecting pins 454*a* and 454*b*, and a first urging mechanism 455. Each of the elements 450, 451, 452, and 453 corresponds to an example of a constituent member of the first drive mechanism.

In the case of the present embodiment, the pair of cylinder connecting pins 454*a* and 454*b* is incorporated in the cylinder connecting mechanism 45. However, the pair of cylinder connecting pins 454*a* and 454*b* may be provided independently of the cylinder connecting mechanism 45.

<First Toothless Gear>

The first toothless gear 450 (also referred to as a switch gear.) has a substantially disk shape. The first toothless gear 450 has a first tooth part 450*a* (see FIG. 9) on a portion of an outer peripheral surface thereof. The first toothless gear 450 is externally fitted and fixed to the transmission shaft 432 and rotates together with the transmission shaft 432.

Such a first toothless gear 450 constitutes a switch gear together with the second toothless gear 460 (see FIG. 8) of the boom connecting mechanism 46. The switch gear selectively transmits the power of the electric motor 41 to any one of the cylinder connecting mechanism 45 and the boom connecting mechanism 46.

Note that in the present embodiment, the first toothless gear 450 and the second toothless gear 460, which are switch gears, are respectively incorporated in the cylinder connecting mechanism 45, which is a first connecting mechanism, and the boom connecting mechanism 46, which is a second connecting mechanism. However, the switch gear may be provided independently of the first connecting mechanism and the second connecting mechanism.

In the following description, when the cylinder connecting mechanism 45 transitions from the extended state (see FIGS. 8, 12, and 18A) to the retracted state (see FIGS. 13 and 18C), a rotation direction (direction of arrow $F_2$ in FIGS. 18A to 18C) of the first toothless gear 450 is a "front side" in the rotation direction of the first toothless gear 450.

On the other hand, the rotation direction of the first toothless gear 450 (direction of arrow $F_1$ in FIGS. 18A to 18C) at the time of state transition from the retracted state to the extended state is a "rear side" in the rotation direction of the first toothless gear 450.

Among the protrusions constituting the first tooth part 450*a*, the protrusion provided on the foremost side in the rotation direction of the first toothless gear 450 is a positioning tooth (not illustrated).

<First Rack Bar>

A first rack bar 451 moves in its longitudinal direction (also referred to as a Y direction.) in accordance with the rotation of the first toothless gear 450. The first rack bar 451 is located closest to a − side in the Y direction in the extended state (see FIGS. 8 and 12). On the other hand, the first rack bar 451 is located closest to a + side in the Y direction in the retracted state (see FIG. 13).

When the state transitions from the extended state to the retracted state, if the first toothless gear 450 rotates forward in the rotation direction, the first rack bar 451 moves to the + side in the Y direction (also referred to as one side in the longitudinal direction.).

On the other hand, when the state transitions from the retracted state to the extended state, if the first toothless gear 450 rotates backward in the rotation direction, the first rack bar 451 moves toward the − side in the Y direction (also referred to as the other side in the longitudinal direction.). A specific configuration of first rack bar 451 will be described below.

The first rack bar 451 is, for example, a shaft member elongated in the Y direction, and is disposed between the first toothless gear 450 and the rod member 31. In this state, the longitudinal direction of the first rack bar 451 coincides with the Y direction.

The first rack bar 451 has a first rack tooth part 451*a* (see FIG. 8) on a surface closer to the first toothless gear 450 (also referred to as a + side in the Z direction.). The first rack tooth part 451*a* meshes with the first tooth part 450*a* of the first toothless gear 450 only during the above-described state transition.

Figure 8:
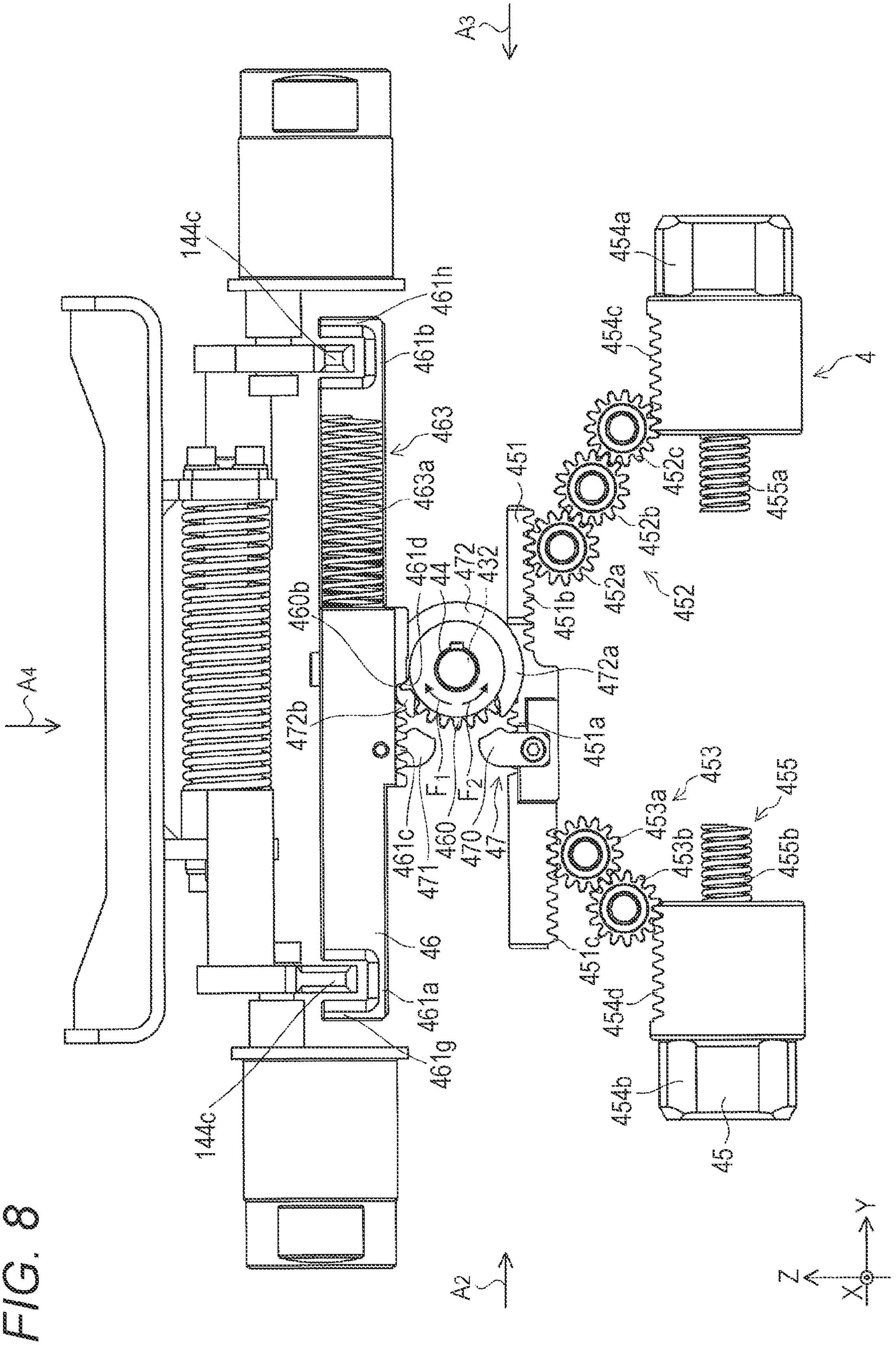
FIG. 8 is a front view of the pin moving module in an extended state and in a state of holding the boom connecting pin.
Figure 9:
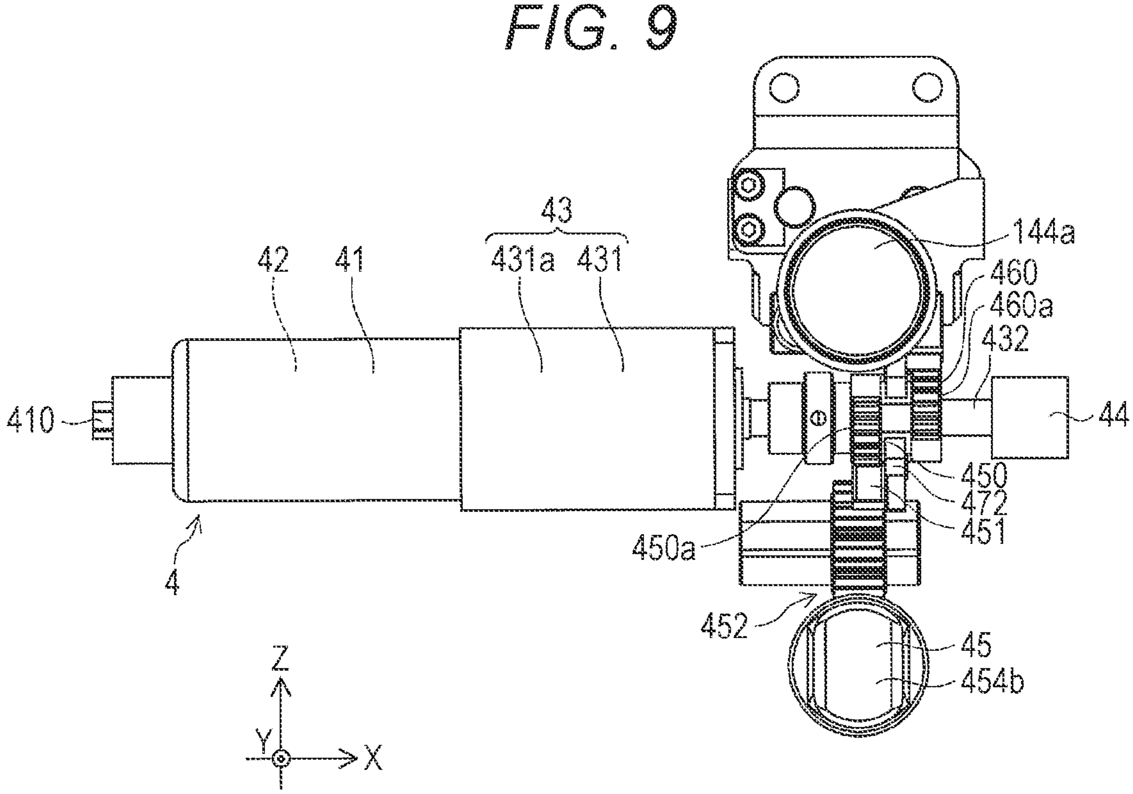
FIG. 9 is a view viewed in arrow $A_2$ in FIG. 8.
Figure 10:
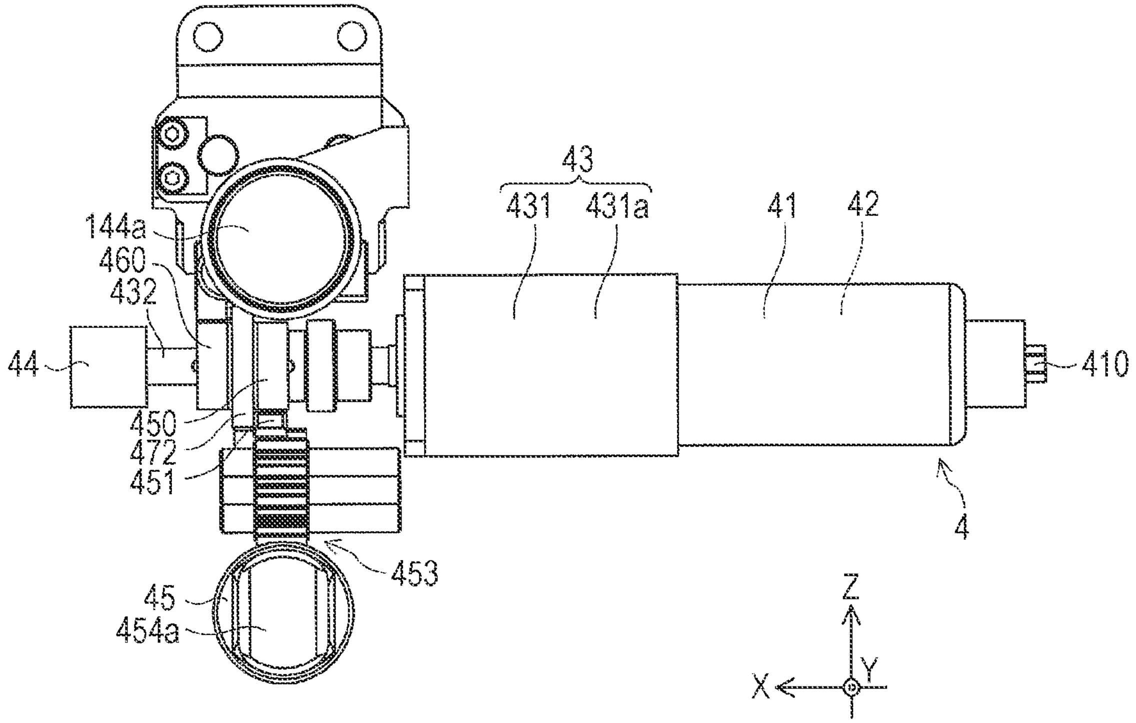
FIG. 10 is a view viewed in arrow $A_3$ in FIG. 8.
Figure 11:
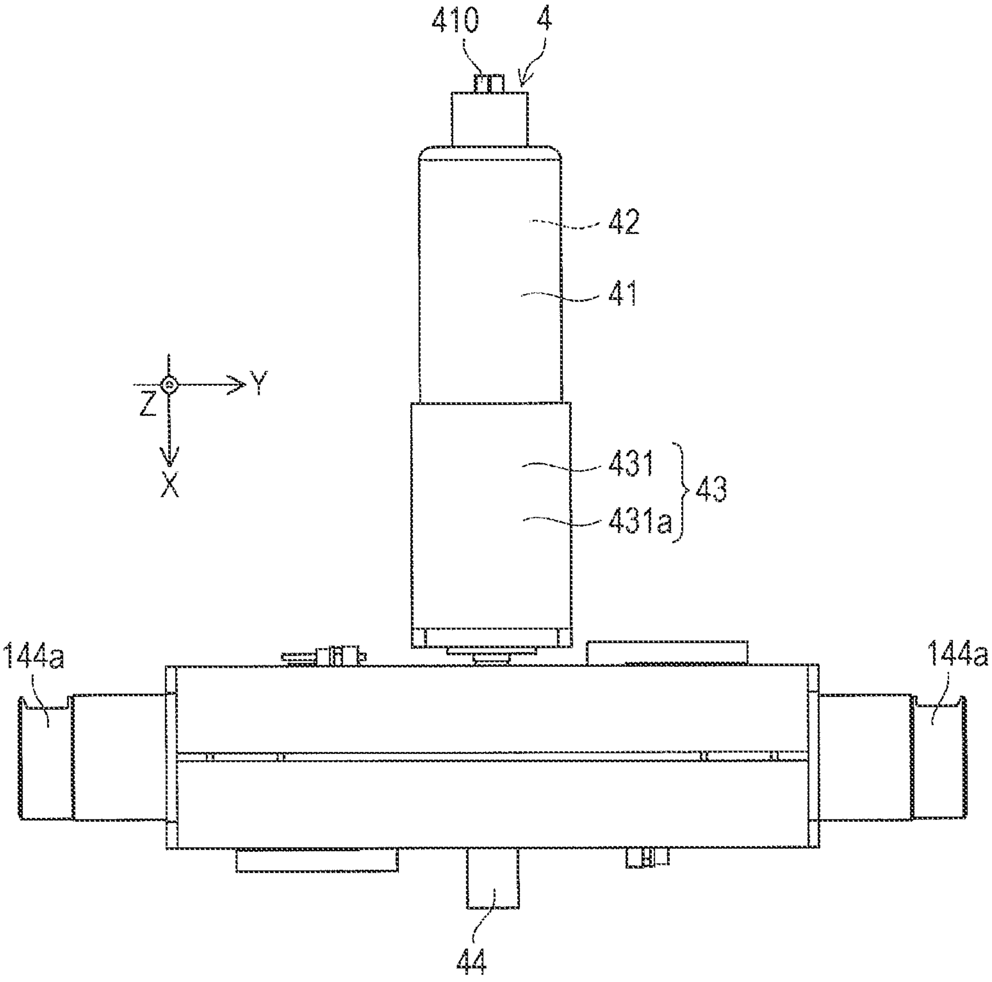
FIG. 11 is a view viewed in arrow $A_4$ in FIG. 8.
Figure 12:
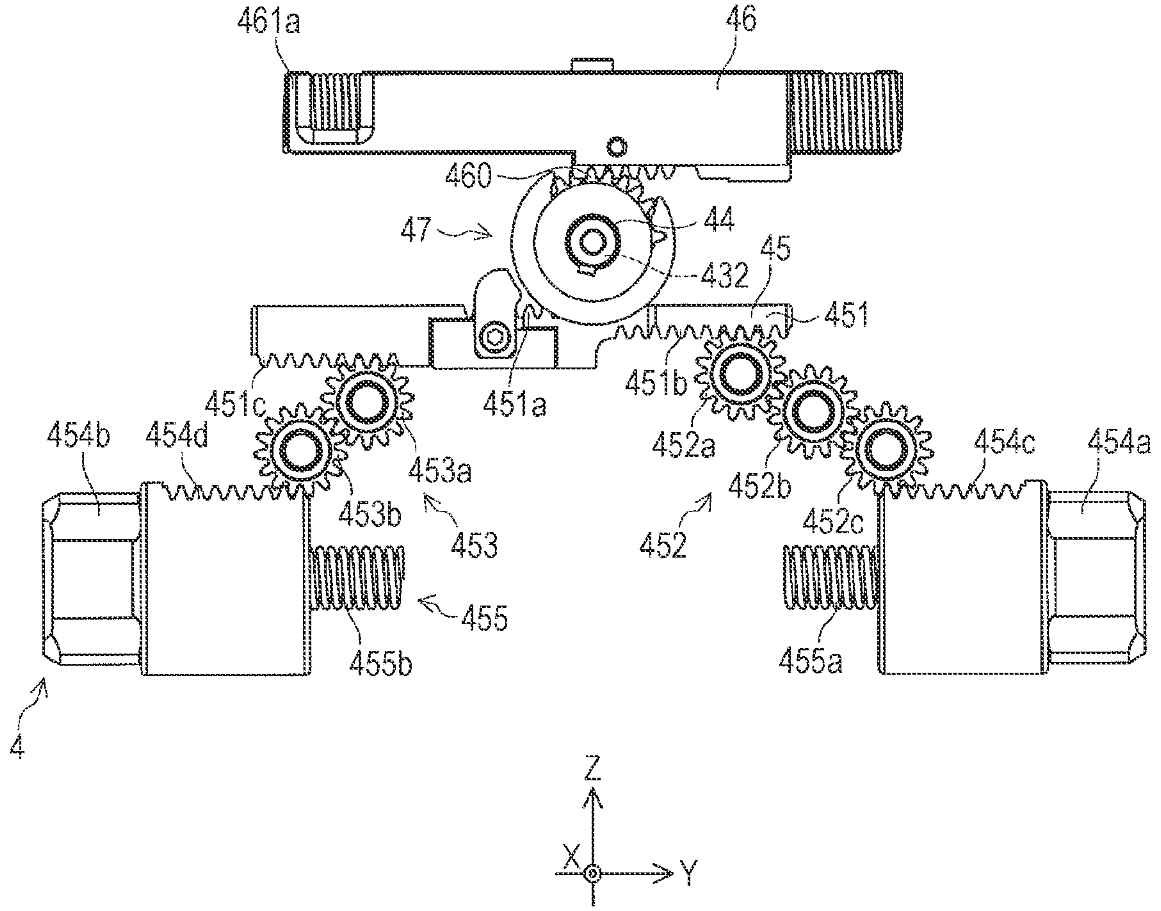
FIG. 12 is a front view of the pin moving module in which a boom connecting mechanism is in a retracted state and a cylinder connecting mechanism is in an extended state.
Figure 13:
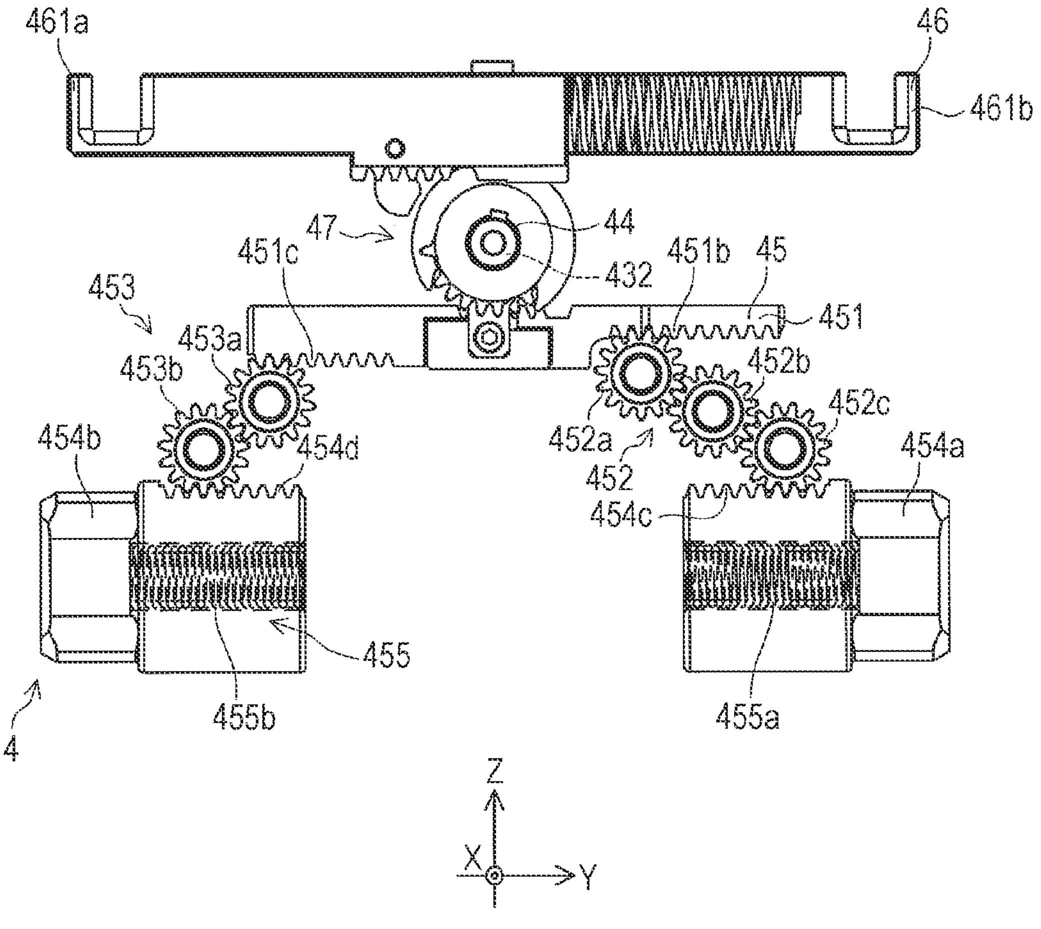
FIG. 13 is a front view of the pin moving module in which a boom connecting mechanism is in an extended state and a cylinder connecting mechanism is in a retracted state.

In the extended state illustrated in FIGS. 8 and 10, a first end face (not illustrated) of the first rack tooth part 451*a* on the + side in the Y direction abuts on the positioning tooth (not illustrated) of the first tooth part 450*a* of the first toothless gear 450 or faces the positioning tooth (not illustrated) in the Y direction with a slight gap interposed therebetween.

When the first toothless gear 450 rotates forward in the rotation direction in the extended state, the positioning tooth 450*b* presses the first end face 451*d* toward the + side in the Y direction, and the first rack bar 451 moves toward the + side in the Y direction.

Then, the tooth part of the first tooth part 450*a* located behind the positioning tooth in the rotational direction meshes with the first rack tooth part 451*a*. As a result, the first rack bar 451 moves to the + side in the Y direction in accordance with the rotation of the first toothless gear 450.

Note that when the first toothless gear 450 rotates backward in the rotation direction from the extended state illustrated in FIG. 8, the first rack tooth part 451*a* and the first tooth part 450*a* of the first toothless gear 450 do not mesh with each other.

In addition, the first rack bar 451 has a second rack tooth part 451*b* and a third rack tooth part 451*c* (see FIG. 8) on a surface on a side (also referred to as a − side in the Z direction.) far from the first toothless gear 450. The second rack tooth part 451*b* meshes with a first gear mechanism 452 to be described later. On the other hand, the third rack tooth part 451*c* meshes with a second gear mechanism 453 to be described later.

<First Gear Mechanism>

The first gear mechanism 452 includes a plurality of (3 in the case of the present embodiment) gear elements 452*a*, 452*b*, and 452*c* (see FIG. 8) each of which is a spur gear. Specifically, the gear element 452*a* meshes with the second rack tooth part 451*b* of the first rack bar 451 and the gear element 452*b*. In the extended state (see FIGS. 8 and 12), the gear element 452*a* meshes with the tooth part at the end portion on the + side in the Y direction or the portion close to the end portion in the second rack tooth part 451*b* of the first rack bar 451.

The gear element 452*b* meshes with the gear element 452*a* and the gear element 452*c*.

The gear element 452*c* meshes with the gear element 452*b* and a pin-side rack tooth part 454*c* of one cylinder connecting pin 454*a* to be described later. In the extended state, the gear element 452*c* meshes with the end portion on the − side in the Y-direction in the pin-side rack tooth part 454*c* (see FIG. 8) of one cylinder connecting pin 454*a*.

<Second Gear Mechanism>

The second gear mechanism 453 includes a plurality of (in the case of the present embodiment, two) gear elements 453*a* and 453*b* (see FIG. 8) each of which is a spur gear. Specifically, the gear element 453*a* meshes with the third rack tooth part 451*c* of the first rack bar 451 and the gear element 453*b*. In the extended state, the gear element 453*a* meshes with the end portion on the + side in the Y direction of the third rack tooth part 451*c* of the first rack bar 451.

The gear element 453*b* meshes with the gear element 453*a* and a pin-side rack tooth part 454*d* (see FIG. 8) of the other cylinder connecting pin 454*b* to be described later. In the extended state, the gear element 453*b* meshes with the end portion on the + side in the Y direction of the pin-side rack tooth part 454*d* of the other cylinder connecting pin 454*b*.

In the case of the present embodiment, the rotation direction of the gear element 452*c* of the first gear mechanism 452 is opposite to the rotation direction of the gear element 453*b* of the second gear mechanism 453.

<Cylinder Connecting Pin>

A central axis of each of the pair of cylinder connecting pins 454*a* and 454*b* coincides with the Y direction and is coaxial with each other. Hereinafter, in the description of the pair of cylinder connecting pins 454*a* and 454*b*, the tip portion is an end portion on a side far from each other, and the proximal end portion is an end portion on a side close to each other.

Each of the pair of cylinder connecting pins 454*a* and 454*b* has pin-side rack tooth parts 454*c* and 454*d* (see FIG. 8) on the outer peripheral surface thereof. The pin-side rack tooth part 454*c* of one (also referred to as the + side in the Y direction.) cylinder connecting pin 454*a* meshes with the gear element 452*c* of the first gear mechanism 452.

One cylinder connecting pin 454*a* moves in its own axial direction (that is, the Y direction) as the gear element 452*c* in the first gear mechanism 452 rotates. Specifically, one cylinder connecting pin 454*a* moves to the + side in the Y direction (also referred to as a second direction.) when the state transitions from the retracted state to the extended state. On the other hand, one cylinder connecting pin 454*a* moves to the − side in the Y direction (also referred to as a first direction.) when the state transitions from the extended state to the retracted state.

The pin-side rack tooth part 454*d* of the other (also referred to as the − side in the "Y direction.") cylinder connecting pin 454*b* meshes with the gear element 453*b* of the second gear mechanism 453. The other cylinder connecting pin 454*b* moves in its own axial direction (that is, the Y direction) as the gear element 453*b* in the second gear mechanism 453 rotates.

Specifically, the other cylinder connecting pin 454*b* moves to the − side in the Y direction (also referred to as a second direction.) when the state transitions from the retracted state to the extended state. On the other hand, the other cylinder connecting pin 454*b* moves to the + side in the Y direction (also referred to as a first direction.) when the state transitions from the extended state to the retracted state. That is, in the above-described state transition, the pair of cylinder connecting pins 454*a* and 454*b* moves in directions opposite to each other in the Y direction.

The pair of cylinder connecting pins 454*a* and 454*b* are respectively inserted into the through holes 400*a* and 400*b* of the first housing element 400. In this state, the tip portions of the pair of cylinder connecting pins 454*a* and 454*b* protrude to the outside of the first housing element 400.

<First Urging Mechanism>

A first urging mechanism 455 automatically returns the cylinder connecting mechanism 45 to the extended state when the electric motor 41 is in the non-energized state in the retracted state of the cylinder connecting mechanism 45. Therefore, the first urging mechanism 455 urges the pair of cylinder connecting pins 454*a* and 454*b* in directions away from each other. Note that the first urging mechanism 455 may directly apply a force to the cylinder connecting pins 454*a* and 454*b*, or may apply a force via another member. In addition, the first urging mechanism 455 may be omitted. In this case, the cylinder connecting mechanism 45 may make a state transition from the retracted state to the extended state based on the power of the electric motor 41.

Specifically, the first urging mechanism 455 includes a pair of coil springs 455*a* and 455*b* (see FIG. 8). Each of the pair of coil springs 455*a* and 455*b* urges the pair of cylinder connecting pins 454*a* and 454*b* toward the tip side. Each of the pair of coil springs 455*a* and 455*b* corresponds to an example of a first urging member.

When the brake mechanism 42 operates, the cylinder connecting mechanism 45 does not automatically return.

<Electric Circuit>

Next, the electric circuit 6 will be described with reference to FIGS. 16A to 16D. The electric circuit 6 is a so-called H-bridge circuit. The electric circuit 6 realizes a plurality of states by switching switches under the control of the control unit 44*b*. A plurality of states realized by the electric circuit 6 will be described later.

The electric circuit 6 includes a power source device 61, a first switch 62, a second switch 63, a third switch 64, a fourth switch 65, and an electric motor 41.

The power source device 61 is provided, for example, on a turning table 12 (see FIG. 1).

The first switch 62 is, for example, a transistor. The first switch 62 is provided on a first line 6L1. The first switch 62 can take either an ON state (state illustrated in FIG. 16B) or an OFF state (states illustrated in FIGS. 16A, 16C, and 16D) under the control of the control unit 44*b* (see FIG. 1).

The second switch 63 is, for example, a transistor. The second switch 63 is provided on the first line 6L1 in series with the first switch 62. The second switch 63 is provided on a downstream side of the first switch 62 in a direction in which a current flows in the first line 6L1. The second switch 63 can take either an ON state (state illustrated in FIGS. 16C and 16D) or an OFF state (state illustrated in FIGS. 16A and 16B) under the control of the control unit 44*b* (see FIG. 1).

The third switch 64 is, for example, a transistor. The third switch 64 is provided on a second line 6L2. The second line 6L2 is parallel to the first line 6L1. The third switch 64 can take either an ON state (state illustrated in FIG. 16C) or an OFF state (states illustrated in FIGS. 16A, 16B, and 16D) under the control of the control unit 44*b* (see FIG. 1).

The fourth switch 65 is, for example, a transistor. The fourth switch 65 is provided on the second line 6L2 in series with the third switch 64. The fourth switch 65 is provided on a downstream side of the third switch 64 in a direction in which a current flows in the second line 6L2. The fourth switch 65 can take either an ON state (state illustrated in FIGS. 16B and 16D) or an OFF state (state illustrated in FIGS. 16A and 16C) under the control of the control unit 44*b* (see FIG. 1).

The configuration of the electric motor 41 is as described above. The electric motor 41 is provided on a third line 6L3. The third line 6L3 connects a portion between the first switch 62 and the second switch 63 in the first line 6L1 and a portion between the third switch 64 and the fourth switch 65 in the second line 6L2.

Figure 16A:
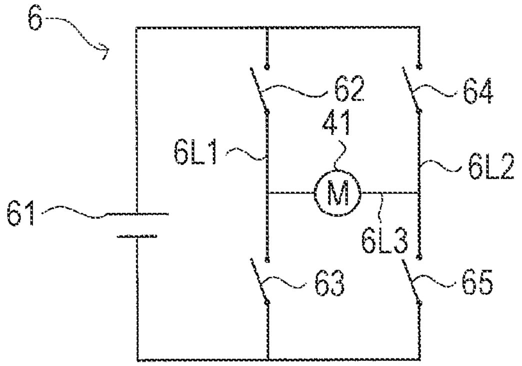
FIG. 16A is a circuit diagram of an electric circuit in a non-energized state.
Figure 16B:
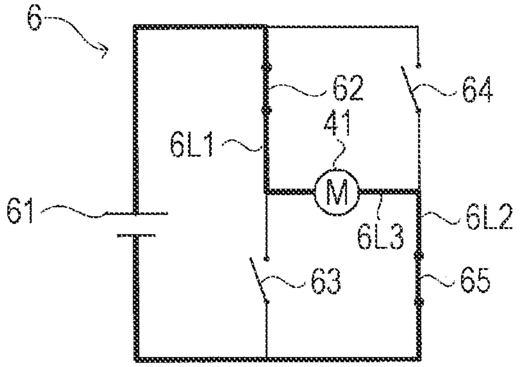
FIG. 16B is a circuit diagram of an electric circuit in a first drive state.
Figure 16C:
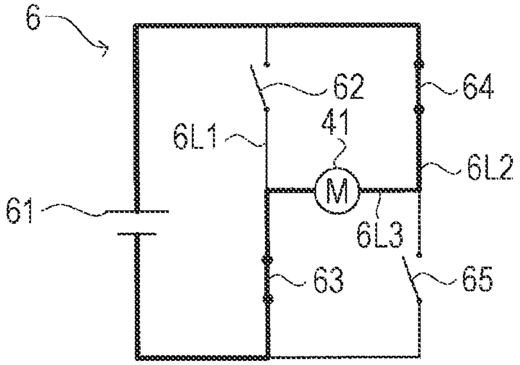
FIG. 16C is a circuit diagram of the electric circuit in a second drive state.
Figure 16D:
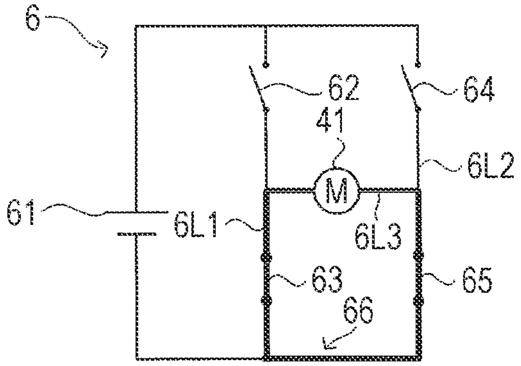
FIG. 16D is a circuit diagram of the electric circuit in a braking state.

The above-described electric circuit 6 can take a non-energized state illustrated in FIG. 16A, a first drive state illustrated in FIG. 16B, a second drive state illustrated in FIG. 16C, and a braking state illustrated in FIG. 16D.

<Non-Energized State>

As illustrated in FIG. 16A, the non-energized state of the electric circuit 6 is a state (also referred to as a state in which a supply of power from the power source device 61 to the electric motor 41 stops.) where the electric motor 41 and the power source device 61 are disconnected. In the non-energized state of the electric circuit 6, each of the switches 62, 63, 64, and 65 is in an OFF state.

<First Drive State>

As illustrated in FIG. 16B, the first drive state of the electric circuit 6 is a state (also referred to as a state in which a supply of power from the power source device 61 to the electric motor 41 is allowed.) where the electric motor 41 and the power source device 61 are connected. In the first drive state of the electric circuit 6, the current flows through a circuit indicated by a thick line in FIG. 16B.

In the first drive state of the electric circuit 6, a current in the first direction flows through the electric motor 41. The first direction is a direction from the first line 6L1 toward the second line 6L2. In the first drive state of the electric circuit 6, the electric motor 41 rotates in the first direction (direction of the arrow $F_2$ in FIGS. 18A to 18C). In the first drive state of the electric circuit 6, the first switch 62 and the fourth switch 65 are in an ON state. In addition, in the first drive state of the electric circuit 6, the second switch 63 and the third switch 64 are in an OFF state. The first drive state corresponds to an example of the drive state of the electric circuit.

<Second Drive State>

As illustrated in FIG. 16C, the second drive state of the electric circuit 6 is a state (also referred to as a state in which a supply of power from the power source device 61 to the electric motor 41 is allowed.) where the electric motor 41 and the power source device 61 are connected. In the second drive state of the electric circuit 6, a current flows through a circuit indicated by a thick line in FIG. 16C.

In the second drive state of the electric circuit 6, the current in the second direction flows through the electric motor 41. The second direction is a direction from the second line 6L2 toward the first line 6L1. In the second drive state of the electric circuit 6, the electric motor 41 rotates (reversely rotates) in the second direction (direction of the arrow $F_1$ in FIGS. 19A to 19C). In the second drive state of the electric circuit 6, the second switch 63 and the third switch 64 are in an ON state. In addition, in the second drive state of the electric circuit 6, the first switch 62 and the fourth switch 65 are in an OFF state. The second drive state corresponds to an example of the drive state of the electric circuit.

<Braking State>

As illustrated in FIG. 16D, the braking state of the electric circuit 6 is a state in which the connection between the electric motor 41 and the power source device 61 is released (the supply of power from the power source device 61 to the electric motor 41 stops), and a closed circuit 66 (a portion indicated by a thick line in FIG. 16D) is formed in the electric circuit 6. That is, the electric circuit 6 has the closed circuit 66 in the braking state. The closed circuit 66 is a closed circuit including the electric motor 41, the second switch 63, and the fourth switch 65.

In the braking state of the electric circuit 6, the first switch 62 and the third switch 64 are in an OFF state. In addition, in the braking state of the electric circuit 6, the second switch 63 and the fourth switch 65 are in an ON state. Note that the operation of the electric circuit 6 will be described later.

<Operation of Cylinder Connecting Mechanism>

Figure 18B:
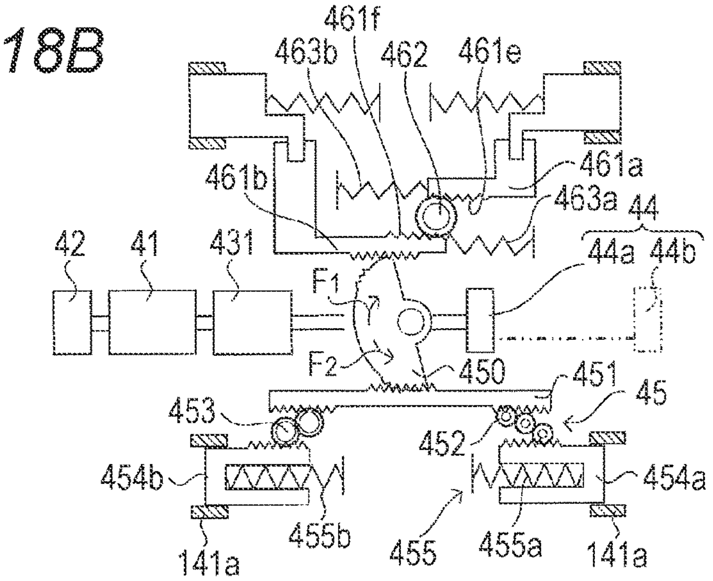
FIG. 18B is a schematic diagram for describing the operation of the cylinder connecting mechanism.
Figure 18C:
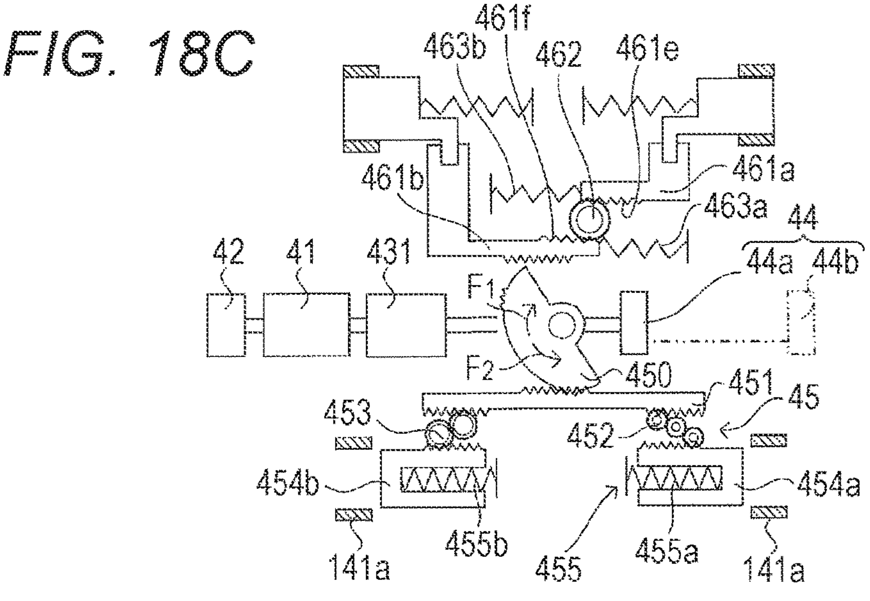
FIG. 18C is a schematic diagram for describing the operation of the cylinder connecting mechanism.

An example of the operation of the above-described cylinder connecting mechanism 45 will be briefly described with reference to FIGS. 18A to 18C. FIGS. 18A to 18C are schematic diagrams for describing the operation of the cylinder connecting mechanism 45.

FIG. 18A is a schematic diagram illustrating an extended state of the cylinder connecting mechanism 45 and an engaged state between the pair of cylinder connecting pins 454*a* and 454*b* and the pair of cylinder pin receiving parts 141*a* of the tip boom element 141. FIG. 18B is a schematic diagram illustrating a state in the middle of the state transition of the cylinder connecting mechanism 45 from the extended state to the retracted state. Furthermore, FIG. 18C is a schematic diagram illustrating a retracted state of the cylinder connecting mechanism 45 and a separated state between the pair of cylinder connecting pins 454*a* and 454*b* and the pair of cylinder pin receiving parts 141*a* of the tip boom element 141.

The cylinder connecting mechanism 45 makes a state transition between an extended state (see FIGS. 8, 12, and 18A) and a retracted state (see FIGS. 13 and 18C) based on the power (that is, rotational motion) of the electric motor 41. Hereinafter, the operation of each unit when the cylinder connecting mechanism 45 transitions from the extended state to the retracted state will be described with reference to FIGS. 18A to 18C.

Note that in FIGS. 18A to 18C, the first toothless gear 450 and the second toothless gear 460 are schematically illustrated as the integrated toothless gear. Hereinafter, for convenience of description, the integrated toothless gear will be described as the first toothless gear 450. In addition, in FIGS. 18A to 18C, the lock mechanism 47 to be described later is omitted. Note that the position of the first toothless gear 450 illustrated in FIG. 18A is defined as a reference position of the first toothless gear 450.

When the cylinder connecting mechanism 45 makes a state transition from the extended state to the retracted state, the control unit 44*b* switches the electric circuit 6 to the first drive state (see FIG. 16B). The power of the electric motor 41 is transmitted to the pair of cylinder connecting pins 454*a* and 454*b* through the following first path and second path.

The first path is a path of the first toothless gear 450→the first rack bar 451→the first gear mechanism 452→one cylinder connecting pin 454*a*.

On the other hand, the second path is a path of the first toothless gear 450→the first rack bar 451→the second gear mechanism 453→the other cylinder connecting pin 454*b*.

Specifically, first, in the first path and the second path, the first toothless gear 450 rotates forward in the rotational direction (direction of the arrow $F_2$ in FIG. 18A) based on the power of the electric motor 41.

In the first path and the second path, when the first toothless gear 450 rotates forward in the rotation direction, the first rack bar 451 moves to the + side in the Y direction (the right side in FIGS. 18A to 18C) according to the rotation.

Then, in the first path, when the first rack bar 451 moves to the + side in the Y direction, one cylinder connecting pin 454*a* moves to the − side in the Y direction (the left side in FIGS. 18A to 18C) via the first gear mechanism 452.

On the other hand, when the first rack bar 451 moves to the + side in the Y direction in the second path, the other cylinder connecting pin 454*b* moves to the + side in the Y direction via the second gear mechanism 453. That is, at the time of the state transition from the extended state to the retracted state, one cylinder connecting pin 454*a* and the other cylinder connecting pin 454*b* move in directions approaching each other.

The position information detection device 44 detects that the pair of cylinder connecting pins 454*a* and 454*b* is separated from the pair of cylinder pin receiving parts 141*a* of the tip boom element 141 and moved to a predetermined position (for example, the position illustrated in FIGS. 2E and 18C). Then, based on the detection result, the control unit 44*b* stops the operation of the electric motor 41.

Note that the state transition (that is, the state transition from FIG. 18C to FIG. 18A) of the cylinder connecting mechanism 45 from the retracted state to the extended state is automatically performed based on the urging force of the first urging mechanism 455 when the brake mechanism 42 is released in the non-energized state of the electric motor 41. At this time, one cylinder connecting pin 454*a* and the other cylinder connecting pin 454*b* move in directions away from each other. 5'2

When the cylinder connecting mechanism 45 makes a state transition from the retracted state to the extended state, the control unit 44*b* switches the electric circuit 6 to the braking state (see FIG. 16D). At this time, the electric motor 41 idles based on the urging force of the first urging mechanism 455. Then, the electric motor 41 generates power based on the idling. The current generated by the electric motor 41 passes through the closed circuit 66 and returns to the electric motor 41. Then, a Lorentz force is generated in the electric motor 41 based on the current returned to the electric motor 41. The Lorentz force acts as a braking force on the electric motor 41. As a result, one cylinder connecting pin 454*a* and the other cylinder connecting pin 454*b* stop at the reference position illustrated in FIG. 18A based on this braking force. Note that the specific operation of the electric circuit 6 will be described later.

The position information detection device 44 detects that the pair of cylinder connecting pins 454*a* and 454*b* is engaged with the pair of cylinder pin receiving parts 141*a* of the tip boom element 141 and moved to a predetermined position (for example, the position illustrated in FIGS. 2A and 18A). The detection result is used to control the next operation in the actuator 2.

<Boom Connecting Mechanism>

The boom connecting mechanism 46 corresponds to an example of an operating unit, and transitions between an extended state (also referred to as a first state. See FIGS. 8 and 13) and a retracted state (also referred to as a second state. see FIG. 12) based on the rotation of the electric motor 41.

In the extended state, the boom connecting mechanism 46 takes either the engaged state or the disengaged state with respect to the boom connecting pin (for example, a pair of boom connecting pins 144*a*).

The boom connecting mechanism 46 disengages the boom connecting pin from the boom element by transitioning from the extended state to the retracted state while being engaged with the boom connecting pin.

In addition, the boom connecting mechanism 46 engages the boom connecting pin with the boom element by transitioning from the retracted state to the extended state while being engaged with the boom connecting pin.

Hereinafter, a specific configuration of the boom connecting mechanism 46 will be described. As illustrated in FIG. 8, the boom connecting mechanism 46 includes the second toothless gear 460, the pair of second rack bars 461*a* and 461*b*, a synchronous gear 462 (see FIGS. 18A to 18C), and a second urging mechanism 463. Each of the elements 460, 461*a*, 461*b*, and 462 corresponds to an example of a constituent member of the second drive mechanism. In addition, the pair of boom connecting pins 144*a* and 144*b* also corresponds to an example of a constituent member of the second drive mechanism.

<Second Toothless Gear>

The second toothless gear 460 (Also referred to as a switch gear.) has a substantially disk shape, and has a second tooth part 460*a* on a portion of the outer peripheral surface thereof in the circumferential direction.

The second toothless gear 460 is externally fitted and fixed to the transmission shaft 432 on the + side in the X direction with respect to the first toothless gear 450, and rotates together with the transmission shaft 432. Note that the second toothless gear 460 may be, for example, a toothless gear integrated with the first toothless gear 450 as in the schematic diagrams illustrated in FIGS. 14A to 14D.

Hereinafter, the rotation direction of the second toothless gear 460 (the direction of the arrow $F_1$ in FIG. 8) when the boom connecting mechanism 46 transitions from the extended state (see FIGS. 8 and 13) to the retracted state (see FIG. 12) is the “front side” in the rotation direction of the second toothless gear 460.

On the other hand, the rotation direction of the second toothless gear 460 (the direction of the arrow $F_2$ in FIG. 8) when the boom connecting mechanism 46 transitions from the retracted state to the extended state is the “rear side” in the rotation direction of the second toothless gear 460.

Among the protrusions constituting the second tooth part 460*a*, the protrusion provided on the foremost side in the rotation direction of the second toothless gear 460 is the positioning tooth 460*b* (see FIG. 8).

Note that FIG. 8 is a view of the pin moving module 4 as viewed from the + side in the X direction. Therefore, in the case of the present embodiment, the front-rear direction in the rotation direction of the second toothless gear 460 is opposite to the front-rear direction in the rotation direction of the first toothless gear 450.

That is, the rotation direction of the second toothless gear 460 when the boom connecting mechanism 46 transitions from the extended state to the retracted state is opposite to the rotation direction of the first toothless gear 450 when the cylinder connecting mechanism 45 transitions from the extended state to the retracted state.

<Second Rack Bar>

Each of the pair of second rack bars 461*a* and 461*b* moves in the Y direction (also referred to as an axial direction.) along with the rotation of the second toothless gear 460. One second rack bars 461*a* (also referred to as the + side in the X direction.) and the other second rack bars 461*b* (also referred to as the side in the −X direction.) move in opposite directions in the Y direction.

One second rack bars 461*a* is located closest to the − side in the Y direction in the extended state. The other second rack bar 461*b* is located closest to the + side in the Y direction in the extended state.

In addition, one second rack bar 461*a* is located closest to the + side in the Y direction in the retracted state. The other second rack bar 461*b* is located closest to the − side in the Y direction in the retracted state.

Note that the movement of one second rack bars 461*a* toward the + side in the Y direction and the movement of the other second rack bar 461*b* toward the − side in the Y direction are restricted by, for example, abutting on a stopper surface 48 (see FIG. 14D) provided on the housing 40.

Hereinafter, specific configurations of the pair of second rack bars 461*a* and 461*b* will be described below. Each of the pair of second rack bars 461*a* and 461*b* is, for example, a shaft member long in the Y direction, and is disposed in parallel to each other. Each of the pair of second rack bars 461*a* and 461*b* is disposed on the + side in the Z direction with respect to the first rack bar 451. In addition, the pair of second rack bars 461*a* and 461*b* is disposed around the synchronous gear 462 to be described later in the X direction. The longitudinal direction of each of the pair of second rack bars 461*a* and 461*b* coincides with the Y direction.

Each of the pair of second rack bars 461*a* and 461*b* has synchronization rack tooth parts 461*e* and 461*f* (see FIGS. 18A to 18C) on side surfaces facing each other in the X direction. Each of the synchronization rack tooth parts 461*e* and 461*f* meshes with the synchronous gear 462.

When the synchronous gear 462 rotates, one second rack bar 461*a* and the other second rack bar 461*b* move in opposite directions in the Y direction.

Each of the pair of second rack bars 461*a* and 461*b* has locking claw parts 461*g* and 461*h* (also referred to as locking part. See FIG. 8) at the tip portion. Such locking claw parts 461*g* and 461*h* are engaged with the pin-side receiving parts 144*c* (see FIG. 8) provided in the boom connecting pins 144*a* and 144*b* when the boom connecting pins 144*a* and 144*b* are moved.

One second rack bar 461*a* has a driving rack tooth part 461*c* (see FIG. 8) on a first side surface (side surface close to the second toothless gear 460) of the second toothless gear 460. The driving rack tooth part 461*c* meshes with the second tooth part 460*a* of the second toothless gear 460.

In the extended state (see FIG. 8), a first end face 461*d* (end face on the + side in the Y direction) of the driving rack tooth part 461*c* abuts on the positioning tooth 460*b* in the second tooth part 460*a* of the second toothless gear 460 or faces the positioning tooth 460*b* in the Y direction with a slight gap interposed therebetween.

When the second toothless gear 460 rotates forward in the rotation direction from the extended state, the positioning tooth 460*b* presses the first end face 461*d* toward the + side in the Y direction. With such pressing, one second rack bar 461*a* moves to the + side in the Y direction.

When one second rack bars 461*a* moves to the + side in the Y direction, the synchronous gear 462 rotates, and the other second rack bar 461*b* moves to the − side in the Y direction (that is, the side opposite to one second rack bar 461*a*).

<Second Urging Mechanism>

The second urging mechanism 463 automatically returns the boom connecting mechanism 46 to the extended state when the electric motor 41 is in the non-energized state in the retracted state of the boom connecting mechanism 46. Note that when the brake mechanism 42 is in operation, the boom connecting mechanism 46 is not automatically returned. In addition, the second urging mechanism 463 may be omitted. In this case, the boom connecting mechanism 46 may transition from the retracted state to the extended state based on the power of the electric motor 41.

Thus, the second urging mechanism 463 urges the pair of second rack bars 461*a* and 461*b* in directions away from each other. Specifically, the second urging mechanism 463 includes a pair of coil springs 463*a* and 463*b* (see FIGS. 18A to 17C). The pair of coil springs 463*a* and 463*b* urges the proximal end portions of the pair of second rack bars 461*a* and 461*b* toward the tip side. The pair of coil springs 463*a* and 463*b* corresponds to an example of a second urging member.

<Operation of Boom Connecting Mechanism>

Figure 19B:
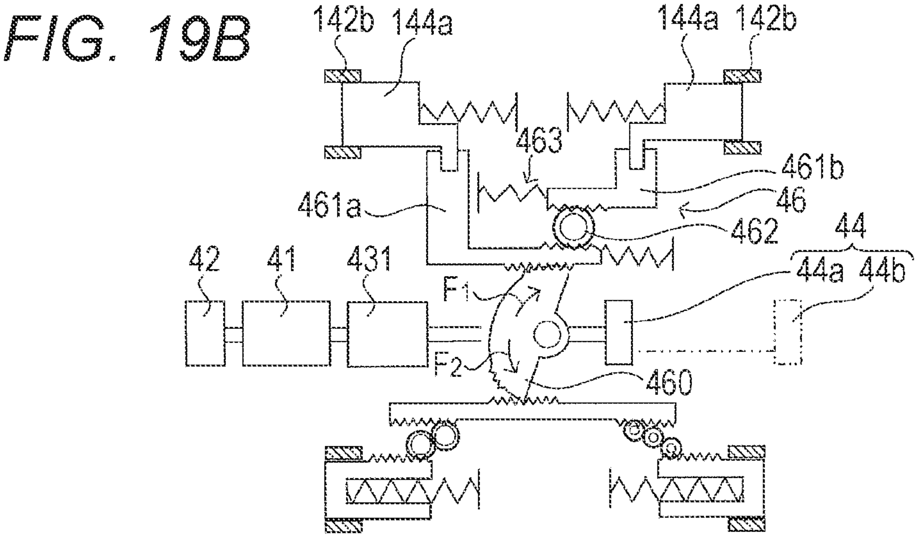
FIG. 19B is a schematic diagram for describing the operation of the boom connecting mechanism.
Figure 19C:
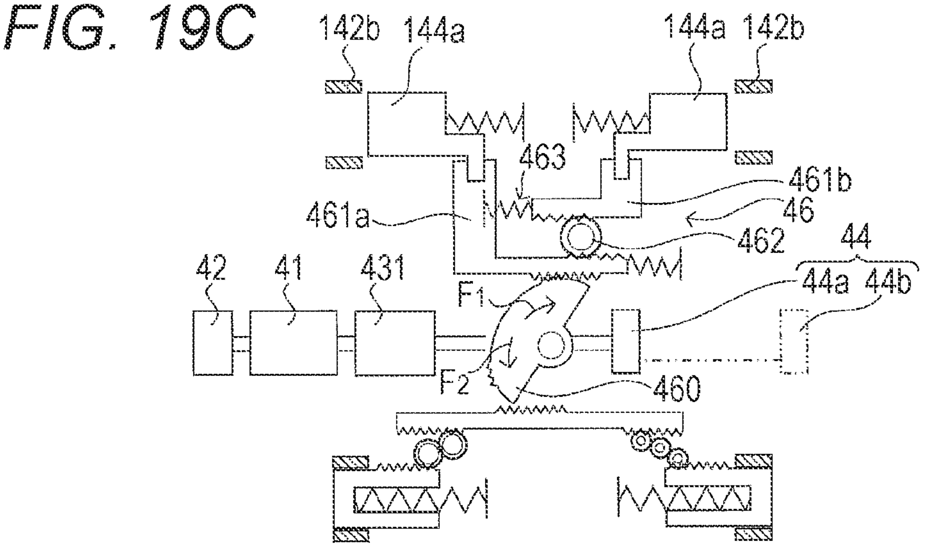
FIG. 19C is a schematic diagram for describing the operation of the boom connecting mechanism.

An example of the operation of the above-described boom connecting mechanism 46 will be briefly described with reference to FIGS. 19A to 19C. FIGS. 19A to 19C are schematic diagrams for describing the operation of the boom connecting mechanism 46.

FIG. 19A is a schematic diagram illustrating an extended state of the boom connecting mechanism 46 and an engaged state between the pair of boom connecting pins 144*a* and the pair of first boom pin receiving parts 142*b* of the intermediate boom element 142. FIG. 19B is a schematic diagram illustrating a state in the middle of the state transition of the boom connecting mechanism 46 from the extended state to the retracted state. Further, FIG. 19C is a schematic diagram illustrating the retracted state of the boom connecting mechanism 46 and the separated state between the pair of boom connecting pins 144*a* and the pair of first boom pin receiving parts 142*b* of the intermediate boom element 142.

The above-described boom connecting mechanism 46 makes the state transition between an extended state (see FIG. 19A) and a retracted state (see FIG. 19C) based on the power (that is, rotational motion) of the electric motor 41. Hereinafter, the operation of each unit when the boom connecting mechanism 46 transitions from the extended state to the retracted state will be described with reference to FIGS. 19A to 19C.

Note that in FIGS. 19A to 19C, the first toothless gear 450 and the second toothless gear 460 are schematically illustrated as the integrated toothless gear. Hereinafter, for convenience of description, the integrated toothless gear will be described as the second toothless gear 460. Note that the position of the second toothless gear 460 illustrated in FIG. 19A is defined as a reference position of the second toothless gear 460. In addition, in FIGS. 19A to 19C, the lock mechanism 47 to be described later is omitted.

When the boom connecting mechanism 46 transitions from the extended state to the retracted state, the control unit 44*b* switches the electric circuit 6 to the second drive state (see FIG. 16C). The power (that is, rotational motion) of the electric motor 41 is transmitted through the path of the second toothless gear 460→one second rack bar 461*a*→the synchronous gear 462→the other second rack bar 461*b*.

First, in the above path, based on the power of the electric motor 41, the second toothless gear 460 rotates forward in the rotation direction (the direction of the arrow $F_1$ in FIGS. 8 and 19A to 19C).

When the second toothless gear 460 rotates forward in the rotation direction, one second rack bar 461*a* moves to the + side in the Y direction (the right side in FIGS. 19A to 19C) according to the rotation.

Then, the synchronous gear 462 rotates according to the movement of one second rack bar 461*a* toward the + side in the Y direction. In accordance with the rotation of the synchronous gear 462, the other second rack bar 461*b* moves to the − side in the Y direction (the left side in FIGS. 19A to 19C).

When the state transitions from the extended state to the retracted state while the pair of second rack bars 461*a* and 461*b* is engaged with the pair of boom connecting pins 144*a*, the pair of boom connecting pins 144*a* is separated from the pair of first boom pin receiving parts 142*b* of the intermediate boom element 142 (see FIG. 19C).

The position information detection device 44 detects that the pair of boom connecting pins 144*a* is separated from the pair of first boom pin receiving parts 142*b* of the intermediate boom element 142 and moved to a predetermined position (for example, positions illustrated in FIGS. 2B and 19C). Then, based on the detection result, the control unit 44*b* stops the operation of the electric motor 41.

Note that when the brake mechanism 42 is released in the non-energized state of the electric motor 41, the insertion operation (that is, the state transition from FIG. 19C to FIG. 19A) of the boom connecting mechanism 46 is automatically performed based on the urging force of the second urging mechanism 463. During this state transition, the pair of boom connecting pins 144*a* moves in directions away from each other.

When the boom connecting mechanism 46 makes a state transition from the retracted state to the extended state, the control unit 44*b* switches the electric circuit 6 to the braking state (see FIG. 16D). Then, when the electric circuit 6 is switched to the closed circuit 66, the above-described braking force is generated in the electric motor 41. As a result, each of the pair of boom connecting pins 144*a* stops at the reference position illustrated in FIG. 19A based on the braking force. Note that the operation of the electric circuit 6 will be described later.

The position information detection device 44 detects that the pair of boom connecting pins 144*a* is engaged with the pair of first boom pin receiving parts 142*b* of the intermediate boom element 142 and moved to a predetermined position (for example, positions illustrated in FIGS. 2A and 19A). The detection result is used to control the next operation in the actuator 2.

In addition, in the case of the present embodiment, the pulled state of the cylinder connecting pin and the pulled state of the boom connecting pin are prevented from being simultaneously realized in one boom element (for example, the tip boom element 141).

For this reason, the state transition of the cylinder connecting mechanism 45 and the state transition of the boom connecting mechanism 46 are prevented from simultaneously occurring Specifically, when the first tooth part 450*a* of the first toothless gear 450 meshes with the first rack tooth part 451*a* of the first rack bar 451 in the cylinder connecting mechanism 45, the second tooth part 460*a* of the second toothless gear 460 does not mesh with the driving rack tooth part 461*c* of one second rack bar 461*a* in the boom connecting mechanism 46.

In addition, when the second tooth part 460*a* of the second toothless gear 460 meshes with the driving rack tooth part 461*c* of one second rack bar 461*a* in the boom connecting mechanism 46, the first tooth part 450*a* of the first toothless gear 450 does not mesh with the first rack tooth part 451*a* of the first rack bar 451 in the cylinder connecting mechanism 45.

Note that in the present embodiment, the operating units are the cylinder connecting mechanism 45 and the boom connecting mechanism 46 described above. However, the operating unit is not limited to the cylinder connecting mechanism 45 and the boom connecting mechanism 46. The operating unit may be various mechanisms that operate based on the power of the electric drive source.

<Lock Mechanism>

As described above, in the actuator 2 according to the present embodiment, the pulled state of the cylinder connecting pin and the pulled state of the boom connecting pin are not simultaneously realized in one boom element (for example, the tip boom element 141) based on the configurations of the boom connecting mechanism 46 and the cylinder connecting mechanism 45. Such a configuration prevents simultaneous operation of the boom connecting mechanism 46 and the cylinder connecting mechanism 45 based on the power of the electric motor 41.

In addition to such a configuration, the actuator 2 according to the present embodiment includes the lock mechanism 47 that prevents the cylinder connecting mechanism 45 and the boom connecting mechanism 46 from simultaneously transitioning when an external force other than the electric motor 41 acts on the cylinder connecting mechanism 45 (for example, first rack bar 451) or the boom connecting mechanism 46 (for example, second rack bar 461*a*).

Such a lock mechanism 47 blocks the operation of one of the boom connecting mechanism 46 and the cylinder connecting mechanism 45 in a state where the other connecting mechanism is operating. Hereinafter, a specific structure of the lock mechanism 47 will be described with reference to FIGS. 14A to 14D. Note that FIGS. 14A to 14D are schematic diagrams for describing the structure of the lock mechanism 47.

In addition, in FIGS. 14A to 14D, the first toothless gear 450 of the cylinder connecting mechanism 45 and the second toothless gear 460 of the boom connecting mechanism 46 are integrally formed to constitute the integrated toothless gear 49 (also referred to as a switch gear.). The integrated toothless gear 49 has a substantially disk shape, and has a tooth part 49*a* on a portion of the outer peripheral surface. The structure of the other portions is the same as the structure of the present embodiment described above.

The lock mechanism 47 includes a first protrusion 470, a second protrusion 471, and a cam member 472 (also referred to as a lock-side rotating member.).

The first protrusion 470 is provided integrally with the first rack bar 451 of the cylinder connecting mechanism 45. Specifically, the first protrusion 470 is provided at a position adjacent to the first rack tooth part 451*a* of the first rack bar 451.

The second protrusion 471 is provided integrally with one second rack bar 461*a* of the boom connecting mechanism 46. Specifically, the second protrusion 471 is provided at a position adjacent to the driving rack tooth part 461*c* of one second rack bars 461*a*.

The cam member 472 is a plate-shaped member having a substantially crescent shape. Such a cam member 472 has a first cam receiving part 472*a* at one end thereof in the circumferential direction. On the other hand, the cam member 472 has a second cam receiving part 472*b* at the other end thereof in the circumferential direction.

For example, the cam member 472 may be externally fitted and fixed to the transmission shaft 432 at the position shifted in the X direction from the position where the integrated toothless gear 49 is externally fitted and fixed. Note that in the present embodiment, the cam member 472 is externally fitted and fixed between the first toothless gear 450 and the second toothless gear 460. That is, the cam member 472 and the integrated toothless gear 49 are provided coaxially. Such a cam member 472 rotates together with the transmission shaft 432. Therefore, the cam member 472 rotates about the central axis of the transmission shaft 432 together with the integrated toothless gear 49.

Note that the cam member 472 may be integrated with the integrated toothless gear 49. In addition, in the present embodiment, the cam member 472 may be integrated with at least one of the first toothless gear 450 and the second toothless gear 460.

As illustrated in FIGS. 14B to 14D and 15A, in a state where the tooth part 49*a* (also the second tooth part 460*a* of the second toothless gear 460.) of the integrated toothless gear 49 meshes with the driving rack tooth part 461*c* of the one second rack bar 461*a*, the first cam receiving part 472*a* of the cam member 472 is located on the + side in the Y direction with respect to the first protrusion 470. At this time, note that the tooth part 49*a* of the integrated toothless gear 49 does not mesh with the first rack tooth part 451*a* of the first rack bar 451.

Figure 15A:
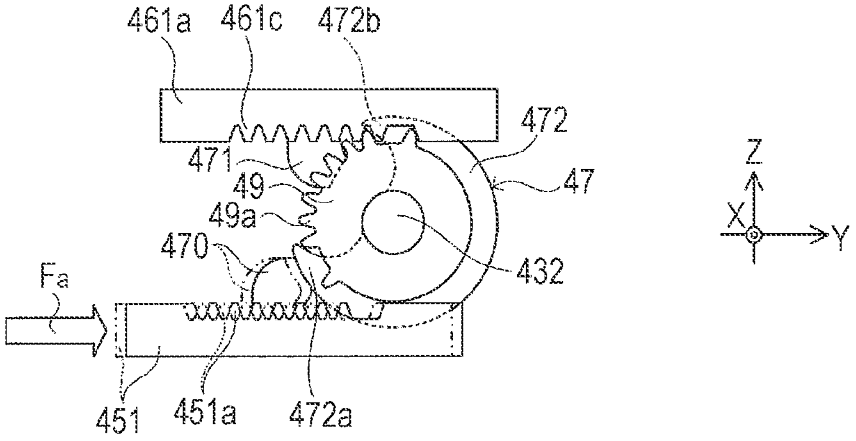
FIG. 15A is a schematic diagram for describing an action of the lock mechanism.

In this state, the first cam receiving part 472*a* and the first protrusion 470 face each other with a slight gap in the Y direction interposed therebetween (see FIG. 15A). As a result, even when an external force on the + side in the Y direction (force in the direction of arrow $F_a$ in FIG. 15A) is applied to the first rack bar 451, the movement of the first rack bar 451 toward the + side in the Y direction is prevented.

Specifically, when the external force $F_a$ on the + side in the Y direction is applied to the first rack bar 451, the first rack bar 451 moves to the + side in the Y direction from the position indicated by the two-dot chain line in FIG. 15A to the position indicated by the solid line. In this state, the first protrusion 470 abuts on the first cam receiving part 472*a* to prevent the first rack bar 451 from moving toward the + side in the Y direction.

Figure 14A:
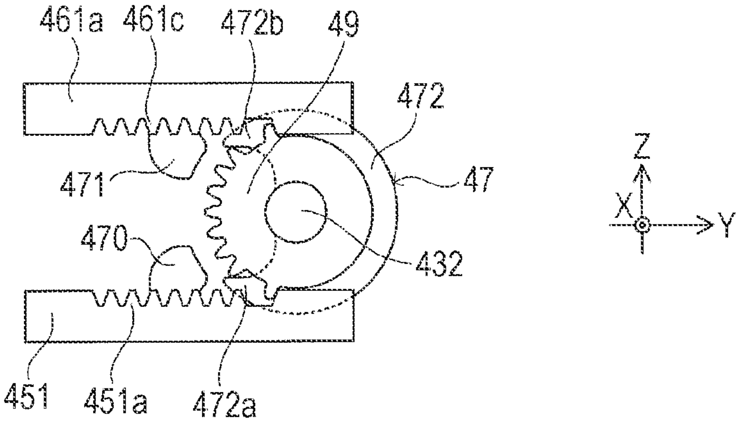
FIG. 14A is a schematic diagram for describing an operation of a lock mechanism.
Figure 14B:
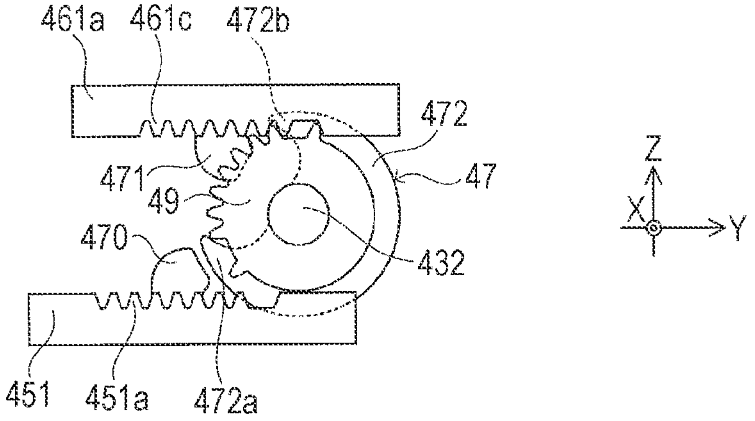
FIG. 14B is a schematic diagram for describing an operation of a lock mechanism.
Figure 14C:
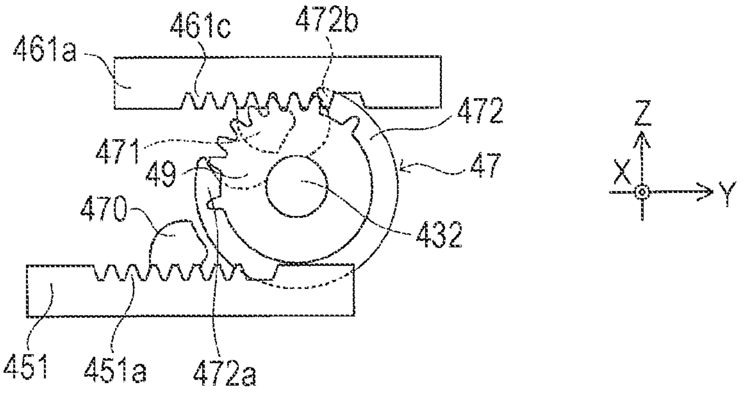
FIG. 14C is a schematic diagram for describing the operation of the lock mechanism.
Figure 14D:
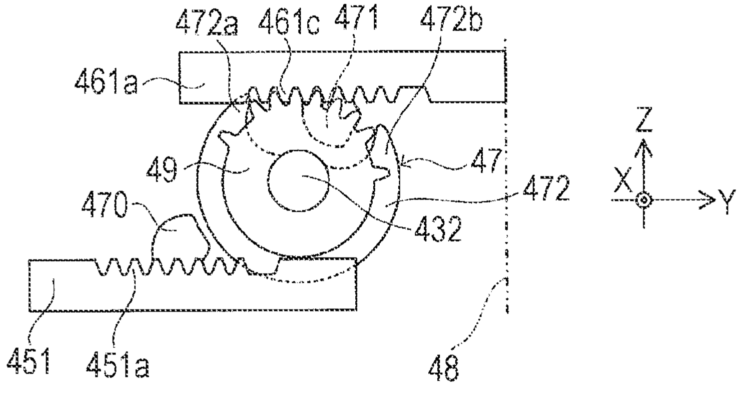
FIG. 14D is a schematic diagram for describing the operation of the lock mechanism.

Note that in the state illustrated in FIGS. 14B to 14D, the outer peripheral surface of the cam member 472 and the first protrusion 470 face each other with a slight gap in the Y direction interposed therebetween. As a result, even when the external force on the + side in the Y direction is applied to the first rack bar 451, the movement of the first rack bar 451 toward the + side in the Y direction is prevented.

Figure 15B:
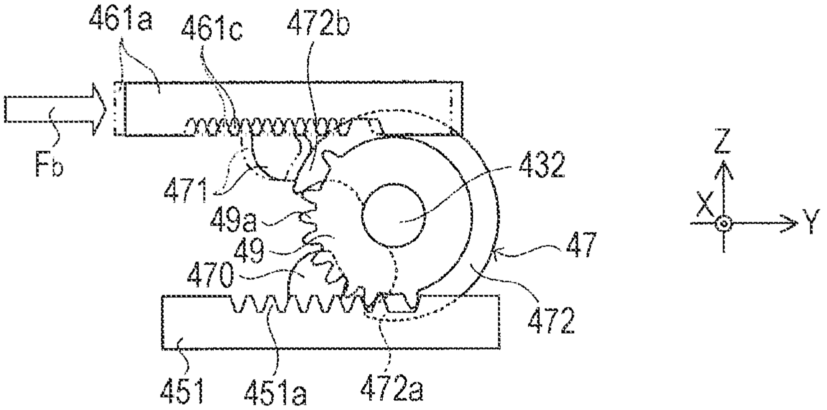
FIG. 15B is a schematic diagram for describing the action of the lock mechanism.

On the other hand, as illustrated in FIG. 15B, in a state where the tooth part 49*a* of the integrated toothless gear 49 (the first tooth part 450*a* of the first toothless gear 450 in the cylinder connecting mechanism 45) meshes with the first rack tooth part 451*a* of the first rack bar 451, the second cam receiving part 472*b* of the cam member 472 is located on the + side in the Y direction with respect to the second protrusion 471.

In this state (a state indicated by a two-dot chain line in FIG. 15B), the second cam receiving part 472*b* and the second protrusion 471 face each other with a slight gap in the Y direction interposed therebetween. As a result, even when the external force on the + side in the Y direction (arrow $F_b$ in FIG. 15B) is applied to one of the second rack bars 461*a*, the one of the second rack bars 461*a* is prevented from moving toward the + side in the Y direction.

Specifically, when the external force $F_b$ on the + side in the Y direction is applied to the one second rack bar 461*a*, the one second rack bar 461*a* moves from the position indicated by the two-dot chain line in FIG. 15B to the position indicated by the solid line in the + side in the Y direction. In this state, the second protrusion 471 abuts on the second cam receiving part 472*b* to prevent the one second rack bar 461*a* from moving toward the + side in the Y direction.

<Operation of Electric Circuit>

Next, the operation of the electric circuit 6 will be described. The electric circuit 6 can take any one of the above-described non-energized state, first drive state, second drive state, and braking state under the control of the control unit 44*b* (see FIG. 1).

<First Drive State>

Specifically, the electric circuit 6 enters the first drive state (see FIG. 16B) when the cylinder connecting mechanism 45 (also referred to as a first connecting mechanism.) makes a state transition (hereinafter, also referred to as "pulling operation of the cylinder connecting mechanism 45.") from the extended state to the retracted state. In other words, the control unit 44*b* switches the electric circuit 6 to the first drive state in the pulling operation of the cylinder connecting mechanism 45.

<Second Drive State>

In addition, the electric circuit 6 enters the second drive state (see FIG. 16C) when the boom connecting mechanism 46 (also referred to as a second connecting mechanism.) makes a state transition (hereinafter, also referred to as "pulling operation of the boom connecting mechanism 46.") from the extended state to the retracted state. In other words, the control unit 44*b* switches the electric circuit 6 to the second drive state in the pulling operation of the boom connecting mechanism 46.

<Braking State 1>

In addition, the electric circuit 6 is put into the braking state when the boom connecting mechanism 46 transitions (hereinafter, also referred to as "the insertion operation of the boom connecting mechanism 46.") from the retracted state (see FIG. 19C) to the extended state (see FIG. 19A). In other words, the control unit 44*b* switches the electric circuit 6 to the braking state in the insertion operation of the boom connecting mechanism 46.

In the braking state of the electric circuit 6, when the boom connecting mechanism 46 transitions from the retracted state to the extended state, the electric motor 41 idles based on the urging force of the second urging mechanism 463. The electric motor 41 generates power based on the idling. The current generated by the electric motor 41 passes through the closed circuit 66 and returns to the electric motor 41. Then, the Lorentz force is generated in the electric motor 41 based on the current returned to the electric motor 41. The Lorentz force acts as a braking force on the electric motor 41. Note that the current is converted into thermal energy by a resistor (not illustrated) provided in the closed circuit 66. The braking force as described above is adjusted according to the resistance value of the closed circuit 66. As an example, the resistance value may be adjusted manually by an operator.

The braking force described above contributes to prevention of overrun of the second toothless gear 460 (see FIGS. 19A to 19C) in the insertion operation of the boom connecting mechanism 46. The reason will be described with reference to FIGS. 19A to 19C.

First, in the insertion operation of the boom connecting mechanism 46, the second toothless gear 460 rotates in the direction of the arrow $F_2$ in FIG. 19C based on the urging force of the second urging mechanism 463. At this time, note that the electric motor 41 is in a non-energized state. In addition, the brake mechanism 42 is in the released state.

The electric motor 41 idles based on the rotation of the second toothless gear 460. The electric motor 41 generates power based on the idling. The current generated by the electric motor 41 passes through the closed circuit 66 and returns to the electric motor 41. Then, the Lorentz force is generated in the electric motor 41 based on the current returned to the electric motor 41. The Lorentz force acts as a braking force on the electric motor 41. Note that the current is converted into thermal energy by a resistor (not illustrated) provided in the closed circuit 66. Such a braking force also acts on the second toothless gear 460 as a resistance force against the rotation of the second toothless gear 460. Then, the second toothless gear 460 stops at the reference position illustrated in FIG. 19A.

When the second toothless gear 460 stops at the reference position as described above, a force in the pulling operation direction does not act on the cylinder connecting mechanism 45. Note that the force in the pulling operation direction means a force that causes the cylinder connecting mechanism 45 to transition from the state illustrated in FIG. 18A to the state illustrated in FIG. 18B. In addition, when the second toothless gear 460 stops, the idling of the electric motor 41 also stops, so that the above-described braking force is not generated. Therefore, the above-described braking force does not act on the second toothless gear 460 in the stopped state.

Note that the above-described braking force does not have a force that stops the cylinder connecting pins 454*a* and 454*b* and the boom connecting pin 144*a* at a position other than a first end and a second end in the stroke of the cylinder connecting pins 454*a* and 454*b* and the boom connecting pin 144*a*. The first end in the stroke corresponds to the position (the position illustrated in FIGS. 18A and 19A) corresponding to the inserted state of the cylinder connecting pins 454*a* and 454*b* and the boom connecting pin 144*a*. Note that the second end in the stroke corresponds to a position (a position illustrated in FIGS. 18C and 19C) corresponding to the pulled state of the cylinder connecting pins 454*a* and 454*b* and the boom connecting pin 144*a*. That is, the cylinder connecting pins 454*a* and 454*b* and the boom connecting pin 144*a* do not stop during the operation (that is, positions other than both ends in the stroke). When the cylinder connecting pins 454*a* and 454*b* and the boom connecting pin 144*a* stop during the operation, there is a possibility of causing a failure. According to the present embodiment, since it is possible to suppress the cylinder connecting pins 454*a* and 454*b* and the boom connecting pin 144*a* from stopping at a position that causes such a failure, it is possible to suppress the failure of the cylinder connecting mechanism 45 and the boom connecting mechanism 46, and furthermore, the mobile crane 1.

<Braking State 2>

In addition, the electric circuit 6 is put into the braking state when the cylinder connecting mechanism 45 transitions (hereinafter, also referred to as "the insertion operation of the cylinder connecting mechanism 45.") from the retracted state (see FIG. 18C) to the extended state (see FIG. 18A). In other words, the control unit 44*b* switches the electric circuit 6 to the braking state in the insertion operation of the cylinder connecting mechanism 45.

In the braking state of the electric circuit 6, when the cylinder connecting mechanism 45 transitions from the retracted state to the extended state, the electric motor 41 idles based on the urging force of the first urging mechanism 455. The electric motor 41 generates power based on the idling. The current generated by the electric motor 41 passes through the closed circuit 66 and returns to the electric motor 41. Then, the Lorentz force is generated in the electric motor 41 based on the current returned to the electric motor 41. The Lorentz force acts as a braking force on the electric motor 41.

Such braking force contributes to prevention of overrun of the first toothless gear 450 in the insertion operation of the cylinder connecting mechanism 45. The reason is similar to the case of the boom connecting mechanism 46 described above, and thus the description thereof will be omitted.

<Operation of Actuator>

Hereinafter, the telescopic operation of the telescopic boom 14 and the operation of the actuator 2 at the time of the telescopic operation will be described with reference to FIGS. 2A to 2E and 17.

Figure 17:
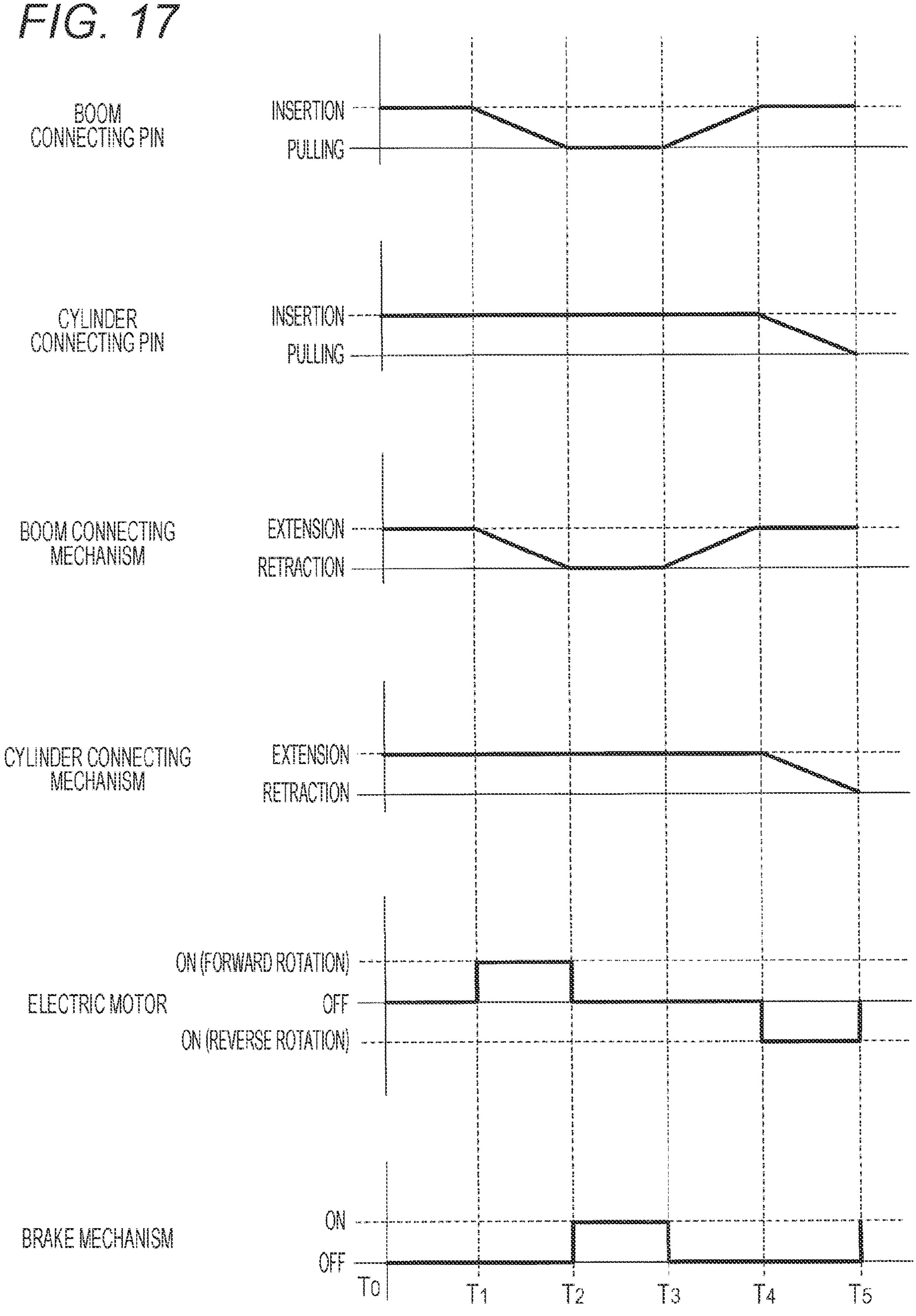
FIG. 17 is a timing chart at the time of an extension operation of a telescopic boom.

FIG. 17 is a timing chart at the time of the extension operation of the tip boom element 141 in the telescopic boom 14.

The actuator 2 according to the present embodiment selectively realizes the pulling operation of the cylinder connecting pins 454*a* and 454*b* and the pulling operation of the boom connecting pin 144*a* by the switching of the rotation direction of one electric motor 41 and a switch gear (that is, the first toothless gear 450 and the second toothless gear 460) that distributes the driving force of the electric motor 41 to the cylinder connecting mechanism 45 and the boom connecting mechanism 46.

Hereinafter, only the extension operation of the tip boom element 141 in the telescopic boom 14 will be described. Note that the retraction operation of the tip boom element 141 is reverse to the following procedure of the extension operation.

Note that in the following description, the state transition between the extended state and the retracted state of the cylinder connecting mechanism 45 and the boom connecting mechanism 46 is as described above. Therefore, a detailed description of the state transition of the cylinder connecting mechanism 45 and the boom connecting mechanism 46 will be omitted.

In addition, the control unit controls switching between ON and OFF of the electric motor 41 and switching between ON and OFF of the brake mechanism 42 based on the output of the position information detection device 44 described above.

FIG. 2A illustrates the retracted state of the telescopic boom 14. In this state, the tip boom element 141 is connected to the intermediate boom element 142 via the boom connecting pin 144*a*. Thus, the tip boom element 141 cannot move in the longitudinal direction (left-right direction in FIGS. 2A to 2E) relative to the intermediate boom element 142.

In addition, in FIG. 2A, the tip portions of the cylinder connecting pins 454*a* and 454*b* are engaged with the pair of cylinder pin receiving parts 141*a* of the tip boom element 141. That is, the tip boom element 141 and the cylinder member 32 are in a connected state.

In the state of FIG. 2A, the state of each member is as follows (see T0 to T1 in FIG. 17).

Brake mechanism 42: OFF

Electric motor 41: OFF

Cylinder connecting mechanism 45: Extended state

Boom connecting mechanism 46: Extended state

Cylinder connecting pins 454*a* and 454*b*: Inserted state

Boom connecting pin 144*a*: Inserted state

Next, in the state illustrated in FIG. 2A, the electric motor 41 rotates forward (rotate in a first direction that is a clockwise direction as viewed from the tip side of the output shaft), and the boom connecting mechanism 46 of the actuator 2 moves the pair of boom connecting pins 144*a* in the direction of separating from the pair of first boom pin receiving parts 142*b* of the intermediate boom element 142. At this time, the boom connecting mechanism 46 transitions from the extended state to the retracted state.

The state of each member at the time of the state transition to FIGS. 2A and 2B is as follows (see T1 to T2 in FIG. 17).

Brake mechanism 42: OFF

Electric motor 41: ON

Cylinder connecting mechanism 45: Extended state

Boom connecting mechanism 46: Extended state→Retracted state

Cylinder connecting pins 454*a* and 454*b*: Inserted state

Boom connecting pin 144*a*: Inserted state→Pulled state

With the above-described state transition, the engagement between the pair of boom connecting pins 144*a* and the pair of first boom pin receiving parts 142*b* of the intermediate boom element 142 is released (see FIG. 2B). Thereafter, the brake mechanism 42 is turned on, and the electric motor 41 is turned off.

Note that the timing to turn off the electric motor 41 and the timing to turn on the brake mechanism 42 are appropriately controlled by the control unit. For example, although not illustrated, the electric motor 41 is turned off after the brake mechanism 42 is turned on.

In the state of FIG. 2B, the state of each member is as follows (see T2 of FIG. 17).

Brake mechanism 42: ON

Electric motor 41: OFF

Cylinder connecting mechanism 45: Extended state

Boom connecting mechanism 46: Retracted state

Cylinder connecting pins 454*a* and 454*b*: Inserted state

Boom connecting pin 144*a*: Pulled state

Next, in the state illustrated in FIG. 2B, pressure oil is supplied to a hydraulic chamber on the extension side in the telescopic cylinder 3 of the actuator 2. Then, the cylinder member 32 moves in the extending direction (left side in FIGS. 2A to 2E).

As the cylinder member 32 moves as described above, the tip boom element 141 moves in the extending direction (see FIG. 2C). At this time, the state of each unit is maintained until the state of T2 in FIG. 17 is T3.

Next, in the state illustrated in FIG. 2C, the brake mechanism 42 is released. Then, based on the urging force of the second urging mechanism 463, the boom connecting mechanism 46 moves the pair of boom connecting pins 144*a* in a direction in which the pair of boom connecting pins 144*a* is engaged with the pair of second boom pin receiving parts 142*c* of the intermediate boom element 142. At this time, the boom connecting mechanism 46 makes the state transition (that is, automatic return) from the retracted state to the extended state. That is, the insertion operation of the boom connecting mechanism 46 is performed.

Note that in the insertion operation of the boom connecting mechanism 46, the electric circuit 6 is in the braking state (see FIG. 16D). When the electric circuit 6 is switched to the closed circuit 66 in the insertion operation of the boom connecting mechanism 46, the above-described braking force acts on the electric motor 41. Each of the pair of boom connecting pins 144*a* stops at the reference position of the boom connecting pin 144*a* illustrated in FIG. 19A based on the braking force.

The state of each member at the time of state transition to FIGS. 2C to 2D is as follows (see T3 to T4 in FIG. 17).

Brake mechanism 42: OFF

Electric motor 41: OFF

Cylinder connecting mechanism 45: Extended state

Boom connecting mechanism 46: Retracted state→Extended state

Cylinder connecting pins 454*a* and 454*b*: Inserted state

Boom connecting pin 144*a*: Pulled state→Inserted state

Then, as illustrated in FIG. 2D, the pair of boom connecting pins 144*a* is engaged with the pair of second boom pin receiving parts 142*c* of the intermediate boom element 142.

The state of each member in the state illustrated in FIG. 2D is as follows (see T4 in FIG. 17).

Brake mechanism 42: OFF

Electric motor 41: OFF

Cylinder connecting mechanism 45: Extended state

Boom connecting mechanism 46: Extended state

Cylinder connecting pins 454*a* and 454*b*: Inserted state

Boom connecting pin 144*a*: Inserted state

Furthermore, in the state illustrated in FIG. 2D, the electric motor 41 reversely rotates (rotates in the second direction, which is the counterclockwise direction as viewed from the tip side of the output shaft), and the cylinder connecting mechanism 45 moves the pair of cylinder connecting pins 454*a* and 454*b* in the direction of separating from the pair of cylinder pin receiving parts 141*a* of the tip boom element 141. At this time, the cylinder connecting mechanism 45 transitions from the extended state to the retracted state.

The state of each member at the time of state transition to FIGS. 2D to 2E is as follows (see T4 to T5 in FIG. 17).

Brake mechanism 42: OFF

Electric motor 41: ON

Cylinder connecting mechanism 45: Extended state→Retracted state

Boom connecting mechanism 46: Extended state

Cylinder connecting pins 454*a*, 454*b*: Inserted state→Pulled state

Boom connecting pin 144*a*: Inserted state

Then, as illustrated in FIG. 2E, the tip portions of the pair of cylinder connecting pins 454*a* and 454*b* are disengaged from the pair of cylinder pin receiving parts 141*a* of the tip boom element 141. Thereafter, the brake mechanism 42 is turned on, and the electric motor 41 is turned off.

The state of each member in the state illustrated in FIG. 2E is as follows (see T5 in FIG. 17).

Brake mechanism 42: ON

Electric motor 41: OFF

Cylinder connecting mechanism 45: Retracted state

Boom connecting mechanism 46: Extended state

Cylinder connecting pins 454*a*, 454*b*: Pulled state

Boom connecting pin 144*a*: Inserted state

Thereafter, although not illustrated, when pressure oil is supplied to the hydraulic chamber on the retraction side in the telescopic cylinder 3 of the actuator 2, the cylinder member 32 moves in the retracting direction (right side in FIGS. 2A to 2E). At this time, since the tip boom element 141 and the cylinder member 32 are in the disconnected state, the cylinder member 32 moves alone in the retracting direction. When the intermediate boom element 142 is extended, the operations in FIGS. 2A to 2E are performed on the intermediate boom element 142.

Action and Effect of Present Embodiment

In the case of the mobile crane 1 of the present embodiment having the above configuration, the electric circuit 6 is in the braking state (see FIG. 16D) during the insertion operation of the boom connecting mechanism 46. Then, when the electric circuit 6 is switched to the closed circuit 66, the above-described braking force is generated in the electric motor 41. When the braking force acts on the electric motor 41, each of the pair of boom connecting pins 144*a* stops at the reference position illustrated in FIG. 19A. As described above, since the overrun of the second toothless gear 460 (see FIG. 19A) of the boom connecting mechanism 46 is prevented, the force in the direction of the state transition from the extended state to the retracted state does not act on the cylinder connecting mechanism 45.

In addition, even in the insertion operation of the cylinder connecting mechanism 45, the electric circuit 6 is in the braking state (see FIG. 16D). Then, when the electric circuit 6 is switched to the closed circuit 66, the above-described braking force is generated in the electric motor 41. When the braking force acts on the electric motor 41, each of the pair of cylinder connecting pins 454*a* and 454*b* stops at the reference position illustrated in FIG. 18A based on the braking force. As described above, since the overrun of the first toothless gear 450 (see FIG. 18A) of the cylinder connecting mechanism 45 is prevented, the force in the direction of the state transition from the extended state to the retracted state does not act on the boom connecting mechanism 46.

In addition, in the case of the mobile crane 1 of the present embodiment, since the cylinder connecting mechanism 45 and the boom connecting mechanism 46 are an electric type, it is not necessary to provide a hydraulic circuit as in the conventional structure in the internal space of the telescopic boom 14. Therefore, it is possible to improve the degree of freedom of design in the internal space of the telescopic boom 14 by effectively utilizing the space used by the hydraulic circuit.

In addition, in the present embodiment, the position information detection device 44 detects the positions of the cylinder connecting pins 454*a* and 454*b* and the boom connecting pins 144*a* and 144*b*. Therefore, in the present embodiment, the proximity sensor for position detection of the cylinder connecting pins 454*a* and 454*b* and the boom connecting pins 144*a* and 144*b* becomes unnecessary. Such a proximity sensor is provided, for example, at a position where an inserted state and a pulled state of each of the cylinder connecting pins 454*a* and 454*b* and the boom connecting pins 144*a* and 144*b* can be detected. In this case, at least the same number of proximity sensors as the number of cylinder connecting pins 454*a*, 454*b* and the number of second rack bars 461*a*, 461*b* are required. On the other hand, in the case of the present embodiment, the positions of each of the cylinder connecting pins 454*a* and 454*b* and the boom connecting pins 144*a* and 144*b* can be detected by the position information detection device 44 (that is, one detection unit) including one detection unit 44*a* as described above.

<Supplementary Note>

According to the present invention, a work machine includes the following as a basic configuration:

- an actuator that extends and retracts a telescopic boom;
- an electric drive source that is provided in the actuator and drives using power supplied from a power source; and
- an operating unit that operates based on power of an electric drive source.

Further, in the case of implementing the present invention, the work machine may further include:

- an electric circuit capable of switching between a drive state in which a supply of power from the power source to the electric drive source is allowed to drive the electric drive source, and a braking state in which the supply of power from the power source to the electric drive source stops to generate a braking force to be applied to the electric drive source; and
- a control unit that controls the switching between the drive state and the braking state.

Further, in the case of implementing the present invention, the boom may additionally include a first boom element and a second boom element that telescopically overlap.

Further, in the case of implementing the present invention, the operating unit may further include:

- a first connecting mechanism that operates based on the power of the electric drive source and switches between a connected state and a disconnected state of the first boom element and the actuator; and
- a second connecting mechanism that operates based on the power of the electric drive source and switches between the connected state and the disconnected state of the first boom element and the second boom element.

Note that the work machine according to an example of the reference example of the present invention may have any configuration selected from the configurations of the work machines described in the above-described embodiments together with the above-described basic configuration. The work machine according to such a reference example is not limited to the crane, and may be various work machines including a telescopic boom.

INDUSTRIAL APPLICABILITY

A crane according to the present invention is not limited to a rough terrain crane, and may be, for example, various mobile cranes such as an all-terrain crane, a truck crane, or a load-type truck crane (also referred to as a cargo crane.). In addition, the crane according to the present invention is not limited to the mobile crane, and may be another crane including a telescopic boom.

REFERENCE SIGNS LIST

1 Mobile crane
10 Traveling body
101 Wheel
11 Outrigger
12 Turning table
14 Telescopic boom
141 Tip boom element
141*a* Cylinder pin receiving part
141*b* Boom pin receiving part

142 Intermediate boom element
142*a* Cylinder pin receiving part
142*b* First boom pin receiving part
142*c* Second boom receiving part
142*d* Third boom receiving part
143 Proximal-end boom element
144*a*, 144*b* Boom connecting pin
144*c* Pin-side receiving part
15 Derricking cylinder
16 Wire
17 Hook
2 Actuator
3 Telescopic cylinder
31 Rod member
32 Cylinder member
4 Pin moving module
40 Housing
400 First housing element
400*a*, 400*b* Through hole
401 Second housing element
401*a*, 401*b* Through hole
41 Electric motor
410 Manual operation unit
42 Brake mechanism
43 Transmission mechanism
431 Speed reducer
431*a* Speed reducer case
432 Transmission shaft
44 Position information detection device
44*b* Control unit
45 Cylinder connecting mechanism
450 First toothless gear
450*a* First tooth part
450*b* Positioning tooth
451 First rack bar
451*a* First rack tooth part
451*b* Second rack tooth part
451*c* Third rack tooth part
451*d* First end face
452 First gear mechanism
452*a*, 452*b*, 452*c* Gear element
453 Second gear mechanism
453*a*, 453*b* Gear element
454*a*, 454*b* Cylinder connecting pin
454*c*, 454*d* Pin-side rack tooth part
455 First urging mechanism
455*a*, 455*b* Coil spring
46 Boom connecting mechanism
460 Second toothless gear
460*a* Second tooth part
460*b* Positioning tooth
461*a*, 461*b* Second rack bar
461*c* Driving rack tooth part
461*d* First end face
461*e*, 461*f* Synchronization rack tooth part
461*g*, 461*h* Locking claw part
462 Synchronous gear
463 Second urging mechanism
463*a*, 463*b* Coil spring
47 Lock mechanism
470 First protrusion
471 Second protrusion
472 Cam member
472*a* First cam receiving part
472*b* Second cam receiving part
48 Stopper surface
49 Integrated toothless gear

49*a* Tooth part
500A Position information detection device
501A First detection device
50A First detected unit
50*f*3, 50*f*5 Third small diameter part
51A First sensor unit
502A Second detection device
52A Second detected unit
6 Electric circuit
61 Power source device
62 First switch
63 Second switch
64 Third switch
65 Fourth switch
66 Closed circuit
6L1 First line
6L2 Second line
6L3 Third line

The invention claimed is:

1. A work machine, comprising:

a telescopic boom including a first boom element and a second boom element that are telescopically overlapped with each other;

a telescopic cylinder that includes a fixing-side member and a movable-side member and extends and retracts the telescopic boom;

a housing fixed to the telescopic cylinder;

an electric drive source that is supported by the housing and drives using power supplied from a power source;

a first connecting mechanism that is housed in the housing and operates based on the power of the electric drive source and switches between a connected state and a disconnected state of the first boom element and the telescopic cylinder;

a second connecting mechanism that is housed in the housing and operates based on the power of the electric drive source and switches between the connected state and the disconnected state of the first boom element and the second boom element;

an electric circuit capable of switching between a drive state in which a supply of power from the power source to the electric drive source is allowed to drive the electric drive source, and a braking state in which the supply of power from the power source to the electric drive source stops to generate a braking force to be applied to the electric drive source; and a control unit that controls the switching between the drive state and the braking state, wherein the electric drive source is one electric motor, the work machine further comprises a switch gear that selectively transmits the power of the one electric motor to any one of the first connecting mechanism and the second connecting mechanism, the drive state includes a first drive state in which the one electric motor rotates in a first direction and a second drive state in which the one electric motor rotates in a second direction, in the first drive state, the first connecting mechanism operates based on an output of the one electric motor transmitted via the switch gear, in the second drive state, the second connecting mechanism operates based on an output of the one electric motor transmitted via the switch gear, in the first drive state, the switch gear is connected to the first connecting mechanism and is not connected to the second connecting mechanism, and in the second drive state, the switch gear is connected to the second connecting mechanism and is not connected to the first connecting mechanism.

2. The work machine according to claim 1, wherein the first connecting mechanism includes a first urging mechanism, switches the first boom element and the movable-side member from the connected state to the disconnected state based on the power of the one electric motor, and switches the first boom element and the movable-side member from the disconnected state to the connected state based on an urging force of the first urging mechanism.

3. The work machine according to claim 2, wherein the control unit puts the electric circuit in the braking state when the first connecting mechanism switches the first boom element and the movable-side member from the disconnected state to the connected state based on the urging force of the first urging mechanism.

4. The work machine according to claim 1, wherein the second connecting mechanism includes a second urging mechanism, switches the first boom element and the second boom element from the connected state to the disconnected state based on the power of the one electric motor, and switches the first boom element and the second boom element from the disconnected state to the connected state based on an urging force of the second urging mechanism.

5. The work machine according to claim 4, wherein the control unit puts the electric circuit in the braking state when the second connecting mechanism switches the first boom element and the second boom element from the disconnected state to the connected state based on the urging force of the second urging mechanism.

6. The work machine according to claim 1, wherein the electric circuit includes a closed circuit including the one electric motor in the braking state, and the braking force is generated by consuming the power generated based on rotation of the one electric motor in the closed circuit.

* * * * *